US010404507B2

(12) United States Patent
Atungsiri

(10) Patent No.: US 10,404,507 B2
(45) Date of Patent: Sep. 3, 2019

(54) IMPLICIT SIGNALING IN OFDM PREAMBLE WITH EMBEDDED SIGNATURE SEQUENCE, AND CYCLIC PREFIX AND POSTFIX AIDED SIGNATURE DETECTION

(71) Applicant: Sony Corporation, Tokyo (JP)

(72) Inventor: Samuel Asangbeng Atungsiri, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/897,468

(22) PCT Filed: Jun. 24, 2014

(86) PCT No.: PCT/GB2014/051922
§ 371 (c)(1),
(2) Date: Dec. 10, 2015

(87) PCT Pub. No.: WO2015/001313
PCT Pub. Date: Jan. 8, 2015

(65) Prior Publication Data

US 2016/0142237 A1 May 19, 2016

(30) Foreign Application Priority Data

Jul. 4, 2013 (GB) .................................. 1312048.0
Feb. 26, 2014 (GB) .................................. 1403392.2
Mar. 20, 2014 (GB) .................................. 1405037.1

(51) Int. Cl.
*H04L 27/26* (2006.01)

(52) U.S. Cl.
CPC ...... *H04L 27/2607* (2013.01); *H04L 27/2613* (2013.01); *H04L 27/2627* (2013.01);
(Continued)

(58) Field of Classification Search
CPC ............ H04L 27/2665; H04L 27/2678; H04L 27/2685; H04L 27/2607; H04L 27/2613
See application file for complete search history.

(56) References Cited

U.S. PATENT DOCUMENTS 6,115,354 A * 9/2000 Weck .................... H04H 20/67
370/203
6,807,241 B1 * 10/2004 Milbar ............... H04L 27/2659
375/142

(Continued)

FOREIGN PATENT DOCUMENTS

CN 101815049 A 8/2010
CN 101 883 070 A 11/2010

(Continued)

OTHER PUBLICATIONS

Digital Video Broadcasting (DVB); Next Generation broadcasting system to Handheld, physical layer specification (DVB-NGH) DVB Document A160, Nov. 2012.*

(Continued)

*Primary Examiner* — Berhanu Tadese
(74) *Attorney, Agent, or Firm* — Oblon, McClelland, Maier & Neustadt, L.L.P.

(57) ABSTRACT

A transmitter transmitting payload data using Orthogonal Frequency Division Multiplexed (OFDM) symbols, including: a frame builder configured to receive the payload data and to receive signalling data to use in detecting and recovering the payload data at a receiver, and to form the payload data with the signalling data into frames for transmission; a modulator configured to modulate a first OFDM symbol with the signalling data and to modulate one or more second OFDM symbols with the payload data; a signature sequence processor circuit providing a signature sequence; a combiner circuit combining the signature sequence with the first OFDM symbol; a prefixing circuit prefixing a guard
(Continued)

interval to the first OFDM symbol to form a preamble; and a transmission circuit transmitting the preamble and the one or more second OFDM symbols. The guard interval is formed from time domain samples of a part of the signature sequence.

25 Claims, 21 Drawing Sheets

(52) U.S. Cl.
CPC ...... *H04L 27/2649* (2013.01); *H04L 27/2655* (2013.01); *H04L 27/2663* (2013.01); *H04L 27/2665* (2013.01); *H04L 27/2678* (2013.01); *H04L 27/2685* (2013.01)

(56) References Cited

U.S. PATENT DOCUMENTS 6,987,752 B1 * 1/2006 Sarraf ................. H04L 27/2657 370/292
7,027,540 B2 * 4/2006 Wilson .................... H04L 7/042 375/354
7,139,338 B2 * 11/2006 Wilson ................ H04L 25/0216 375/343
7,440,506 B2 * 10/2008 Atungsiri ............ H04L 25/0216 375/260
8,121,017 B2 * 2/2012 Stadelmeier ....... H04N 21/4385 370/203
8,295,375 B2 * 10/2012 Stadelmeier ........... H04H 20/46 370/203
9,143,290 B2 * 9/2015 Lovell ................... H04L 5/0046
9,742,607 B2 * 8/2017 Atungsiri ............ H04L 27/2607
9,942,076 B2 * 4/2018 Atungsiri ............ H04L 27/2649
2002/0110202 A1 * 8/2002 Wilson ................ H04L 25/0216 375/340
2002/0126220 A1 * 9/2002 Wilson .................... H04L 7/042 348/518
2004/0092310 A1 * 5/2004 Brosnan ................ G06F 21/606 463/42
2004/0160892 A1 * 8/2004 Agrawalla .......... H04L 27/2628 370/203
2005/0068931 A1 * 3/2005 Cho ........................ H04L 5/026 370/345
2005/0141414 A1 * 6/2005 Cheun ................... H04L 1/0618 370/210
2005/0213680 A1 * 9/2005 Atungsiri ............ H04L 25/0216 375/260
2007/0002742 A1 * 1/2007 Krishnaswamy ............................ H04W 72/1242 370/235
2007/0204291 A1 * 8/2007 Ichihashi ............. H04N 5/4401 725/33
2007/0234139 A1 * 10/2007 Kalantri .................. H04L 1/244 714/712
2009/0003308 A1 * 1/2009 Baxley ..................... H04B 1/59 370/350
2009/0110092 A1 * 4/2009 Taylor ................... H04L 5/0044 375/260
2009/0110094 A1 * 4/2009 Taylor ............... H03M 13/2742 375/260
2009/0110095 A1 * 4/2009 Taylor ................. H03M 13/276 375/260
2010/0041433 A1 * 2/2010 Stadelmeier ........... H04H 20/72 455/552.1
2010/0118994 A1 * 5/2010 Park ....................... H04H 20/31 375/260
2010/0158047 A1 * 6/2010 Lee ...................... H04H 20/103 370/474
2010/0195668 A1 * 8/2010 Robert .................. H04L 5/0007 370/475
2010/0246726 A1 * 9/2010 Asjadi ................... H04L 27/265 375/340
2010/0296593 A1 * 11/2010 Atungsiri .............. H04L 1/0071 375/260
2010/0309384 A1 * 12/2010 Asjadi ................. H04L 27/2605 348/725
2010/0310022 A1 * 12/2010 Asjadi ................. H04L 27/2605 375/343
2011/0172000 A1 * 7/2011 Quigley .................. H04L 12/12 455/574
2011/0274204 A1 * 11/2011 Ko ........................ H04L 1/0057 375/295
2011/0280181 A1 * 11/2011 Guey .................. H04L 27/2607 370/328
2012/0250777 A1 * 10/2012 Peron ................ H03M 13/2742 375/260
2014/0146758 A1 * 5/2014 Lovell ................... H04L 5/0046 370/329
2014/0213244 A1 * 7/2014 Oh ........................ H04W 88/04 455/419
2014/0269981 A1 * 9/2014 Asjadi ................. H04L 27/2601 375/295
2014/0294124 A1 * 10/2014 Atungsiri .............. H04L 1/0017 375/340
2016/0050095 A1 * 2/2016 Atungsiri ............ H04L 27/2607 375/300
2016/0050097 A1 * 2/2016 Atungsiri ............ H04L 27/2602 375/295
2016/0065337 A1 * 3/2016 Atungsiri ............ H04L 27/2613 375/260
2016/0087765 A1 * 3/2016 Guey .................. H04L 27/2607 370/330
2016/0094895 A1 * 3/2016 Stadelmeier ........... H04H 20/59 725/33
2016/0286541 A1 * 9/2016 Webb .................... H04L 5/0037
2017/0237591 A1 * 8/2017 Atungsiri ............. H04B 17/336 375/260

FOREIGN PATENT DOCUMENTS

CN 103 152 312 A 6/2013
EP 0 719 004 A2 6/1996
GB 2512392 1/2014
GB 2515801 A * 1/2015 ......... H04L 27/2607
WO 98/21847 5/1998
WO WO-2018026460 A1 * 2/2018 ....... H03K 19/17728

OTHER PUBLICATIONS

International Search Report dated Sep. 26, 2014, for PCT/GB2014/051922 Filed Jun. 24, 2014.
Li, et al., "Super-Imposed Training Scheme for Timing and Frequency Synchronization in OFDM Systems," IEEE Transactions on Broadcasting, vol. 53, No. 2, Jun. 1, 2007, pp. 574-583, XP011184905.
He, et al., "Signalling-embedded training sequence design for block transmission systems," 7th International Wireless Communications and Mobile Computing Conference, IEEE, Jul. 4, 2011, pp. 647-651, XP031962172.
Wen, et al., "A Novel Postfix Synchronization Method for OFDM Systems," IEEE International Symposium on Personal, Indoor, and Mobile Radio Communications. 2007, pp. 1-5, XP031168134.
Lim, et al., "Novel Frame Synchronization of OFDM Scheme for High-Speed Power Line Communication Systems." IEEE International Symposium on Power Line Communications and its Applications. 2008, pp. 182-186.
Korean Office Action dated Feb. 24, 2017, issued in Korean Patent Application No. 10-2016-7000026 (English translation).
"Next Generation broadcasting system to Handheld, physical layer specification (DVB-NGH)," DVB Document A160 (Nov. 2012).
Combined Chinese Office Action and Search Report dated Jan. 23, 2018 in corresponding Patent Application No. 2014800382470 (English Translation only) citing document AO therein, 8 pages.
Korean Office Action dated May 16, 2018 in Korean Patent Application No. 10-2018-7006958; EU IPD Ref.: I-14-037-KR DIV, 6 pages English translation only.

(56) References Cited

OTHER PUBLICATIONS

Rich Rdmond—Chief Product Officer; GatesAir—DVB-T2 Impact on Business Models—system choices can impact the environment and your bottom line, Mar. 6, 2012; ABU Digital Broadcasting Symposium 2012, 16 pages.
Kazunori Yolohata; USDB-T, the Digital Television for the Philippines—Presentation 3—Emergency Warning Broadcast System; Oct. 9th -10th , 2008, Manila Philippines, Dibeg Japan (NHK Science & Technical Research Lab), DiBET Digital broadcasting experts group, 45 pages.
U.S. Appl. No. 14/778,922, filed Sep. 21, 2015, Samuel Asangbeng Atungsiri, et al.
U.S. Appl. No. 14/778,954, filed Sep. 21, 2015, Samuel Asangbeng Atungsiri.
U.S. Appl. No. 14/226,937, filed Mar. 27, 2014, US-2014-0294124-A1, Samuel Asangbeng Atungsiri, et al.
U.S. Appl. No. 14/778,909, filed Sep. 21, 2015, Samuel Asangbeng Atungsiri, et al.
U.S. Appl. No. 14/771,282, filed Aug. 28, 2015, Gholam Hosein Asjadi.

* cited by examiner

IMPLICIT SIGNALING IN OFDM PREAMBLE WITH EMBEDDED SIGNATURE SEQUENCE, AND CYCLIC PREFIX AND POSTFIX AIDED SIGNATURE DETECTION

FIELD OF THE DISCLOSURE

The present disclosure relates to transmitters, receivers and methods of transmitting and receiving payload data using Orthogonal Frequency Division Multiplexed (OFDM) symbols.

The present disclosure claims the Paris convention priority of UK patent applications 1312048.0 and 1403392.2 the contents of which are herein incorporated into the present application by reference.

BACKGROUND OF THE DISCLOSURE

There are many examples of radio communications systems in which data is communicated using Orthogonal Frequency Division Multiplexing (OFDM). Television systems which have been arranged to operate in accordance with Digital Video Broadcasting (DVB) standards for example, use OFDM for terrestrial and cable transmissions. OFDM can be generally described as providing K narrow band sub-carriers (where K is an integer) which are modulated in parallel, each sub-carrier communicating a modulated data symbol such as for example Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation.

As indicated above, the number of narrowband carriers K in an OFDM symbol can be varied depending on operational requirements of a communications system. The guard interval represents overhead and so is preferably minimized as a fraction of the OFDM symbol duration in order to increase spectral efficiency. For a given guard interval fraction, the ability to cope with increased multipath propagation whilst maintaining a given spectral efficiency can be improved by increasing the number K of sub-carriers thereby increasing the duration of the OFDM symbol. However, there can also be a reduction in robustness in the sense that it may be more difficult for a receiver to recover data transmitted using a high number of sub-carriers compared to a smaller number of sub-carriers, because for a fixed transmission bandwidth, increasing the number of sub-carriers K also means reducing the bandwidth of each sub-carrier. A reduction in the separation between sub-carriers can make demodulation of the data from the sub-carriers more difficult for example, in the presence of Doppler frequency. That is to say that although a larger number of sub-carriers (high order operating mode) can provide a greater spectral efficiency, for some propagation conditions, a target bit error rate of communicated data may require a higher signal to noise ratio to achieve than required for a lower number of sub-carriers.

As will be appreciated, therefore providing an arrangement in which signaling data conveying information for the detection of payload data carrying OFDM symbols can represent a significant challenge.

SUMMARY OF THE DISCLOSURE

Various further aspects and embodiments of the disclosure are provided in the appended claims, including but not limited to a transmitter for transmitting payload data using Orthogonal Frequency Division Multiplexed (OFDM) symbols, the transmitter comprising a frame builder configured to receive the payload data to be transmitted and to receive signalling data for use in detecting and recovering the payload data at a receiver, and to form the payload data with the signalling data into frames for transmission. The transmitter also comprising a modulator configured to modulate a first OFDM symbol with the signalling data and to modulate one or more second OFDM symbols with the payload data, a signature sequence circuit for providing a signature sequence, a combiner circuit for combining the signature sequence with the first OFDM symbol, a prefixing circuit for prefixing a guard interval to the first OFDM symbol to form a preamble, and a transmission circuit for transmitting the preamble and the one or more second OFDM symbols. The combiner is configured to combine the signature sequence with the first OFDM symbol, and the guard interval is formed from time domain samples of a part of the signature sequence.

Embodiments of the present technique can be arranged to form the guard interval of the OFDM symbol carrying the signalling data to include samples formed only from a part of a signature sequence, the OFDM symbol and the guard interval forming a preamble for the one or more second OFDM symbols. By arranging for the guard interval of the OFDM symbol carrying the signalling data to include samples formed only from a part of a signature sequence, there is an increased likelihood of a receiver detecting the signature sequence, for example using a matched filter. Furthermore by combining the signature sequence with the OFDM symbol carrying the signalling data, then an accuracy of channel impulse response estimation at the receiver using the signature sequence is correspondingly increased.

In accordance with the present technique a transmitter is adapted to form a preamble which comprises an OFDM symbol carrying signalling data which forms part of a transmission frame. In order to detect a signature sequence which is combined with the preamble and to allow decoding of the signalling data in presence of inter-channel interference caused by a significant echo path, embodiments of the present technique arrange for the guard interval of the preamble to be formed entirely from samples which are formed from a part of the signature sequence which has been copied from the time domain samples which are combined with the first OFDM symbol carrying the signalling data. The signature sequence may be added at a lower power to the time domain samples of the OFDM symbol carrying the signalling data. Accordingly, correlation in the time domain to detect a channel impulse response may include parts of the signature sequence present throughout the preamble.

Furthermore, in order to improve a likelihood of correctly detecting the signalling data, in one example, the post fix samples are formed from another part of the signature sequence which the part of the signature sequence which forms the guard interval. The samples of one part of the signature sequence which forms the guard interval/pre-fix and the sample of the other part of the signature sequence which forms the post-fix are therefore different part of the signature sequence or part thereof which is combined with the first OFDM symbol carrying the signalling data. With such an arrangement a significant echo path which may cause inter-channel interference at the receiver can be cancelled by synthesising and removing the part of the post fix which causes inter-channel interference in the wanted samples of the OFDM symbol carrying the signalling data.

According to the embodiments of the present technique therefore, a preamble may be formed from a first OFDM symbol carrying the signalling data, a guard interval which forms a pre-fix generated from only time domain samples of the signature sequence which is also combined at a reduced power level with the OFDM symbol carrying the signalling data and a post fix formed from another part of the time domain samples of the signature sequence which is combined with the first OFDM symbol to form the guard interval.

In some examples, the transmitter can chose from amongst a group of signature sequences which signature sequence it uses and a receiver may detect from the guard interval which signature sequence has been combined with the first OFDM symbol. Consequently a message conveyed by the choice of signature sequence may be detected from the guard interval only and without having to detect the content of the first OFDM symbol.

In another embodiment the signature sequence may be produced by either a pseudo random binary sequence generator, an M-sequence generator or a Gold code sequence generator.

The use of such binary sequences allows differential matched filtering of the received guard intervals to be performed without reducing the accuracy of the signature sequence detection. The use of differential encoding allows matched filtering to be utilised for frame synchronisation or preamble detection when a frequency offset is present in the received signal.

In another embodiment the message provided by a selection of the signature sequence is an indication of an early warning signal (EWS).

Utilising the choice of conveyed signature sequence to carry an EWS message enables OFDM receivers to quickly, reliably and efficiently detect an EWS and therefore provide an EWS and related information to a user of the receiver. Performing EWS detection on the guard interval allows a low complexity approach to detection of a EWS which may be performed whilst the receiver is in a reduced power or standby state. This therefore allows EWS detection to be performed intermittently without consuming a large amount of power.

In another embodiment there is provided a receiver for detecting and recovering payload data from a received signal, the receiver comprising a detector circuit for detecting the received signal. The received signal comprises the payload data, signalling data for use in detecting and recovering the payload data, the signalling data being carried by a first Orthogonal Frequency Division Multiplexed (OFDM) symbol, and the payload data being carried by one or more second OFDM symbols, and the first OFDM symbol having been combined with the signature sequence and prefixed with a guard interval comprising a part of the signature sequence, the symbol being followed by post fix samples which are formed from another part of the signature sequence which forms the guard interval, to form a preamble.

The receiver also comprises a synchronisation circuit comprising a matched filter, and a demodulator circuit for recovering the signalling data from the first OFDM symbol for recovering the payload data from the second OFDM symbols. The matched filtering circuit comprises a guard interval duration matched filter, the guard interval duration matched filter having an impulse response matched to a differentially encoded predetermined portion of time domain samples of the signature sequence. The effect of the matched filtering is that an output of the guard interval duration matched filter generates a signal representing a correlation of the differentially encoded predetermined portion of time domain samples of the signature sequence and a differentially encoded portion of the received signal corresponding to the guard interval. This therefore allows the matched filtering circuit to detect the signature sequence from which the guard interval of the received signal has been formed and with which the first OFDM symbol has been combined. In this manner the receiver may detect from the guard interval which signature sequence has been combined with the first OFDM symbol and the channel impulse response.

In one example a message conveyed by the signature sequence may be detected from the guard interval without having to detect and process the whole preamble. This therefore reduces the processing required at a receiver in order to establish which signature sequence has been transmitted, thus decreasing processing times and complexity with regards to detecting a conveyed message.

Various further aspects and features of the present disclosure are defined in the appended claims, which include a method of transmitting payload data and a method of detecting and recovering payload data.

BRIEF DESCRIPTION OF THE DRAWINGS

Embodiments of the present disclosure will now be described by way of example only with reference to the accompanying drawing in which like parts are provided with corresponding reference numerals and in which FIG. 1 provides a schematic diagram illustrating an arrangement of a broadcast transmission network.

DETAILED DESCRIPTION OF EXAMPLE EMBODIMENTS

Embodiments of the present disclosure can be arranged to form a transmission network for transmitting signals representing data including video data and audio data so that the transmission network can, for example, form a broadcast network for transmitting television signals to television receiving devices. In some examples the devices for receiving the audio/video of the television signals may be mobile devices in which the television signals are received while on the move. In other examples the audio/video data may be received by conventional television receivers which may be stationary and may be connected to a fixed antenna or antennas.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Figure 1:
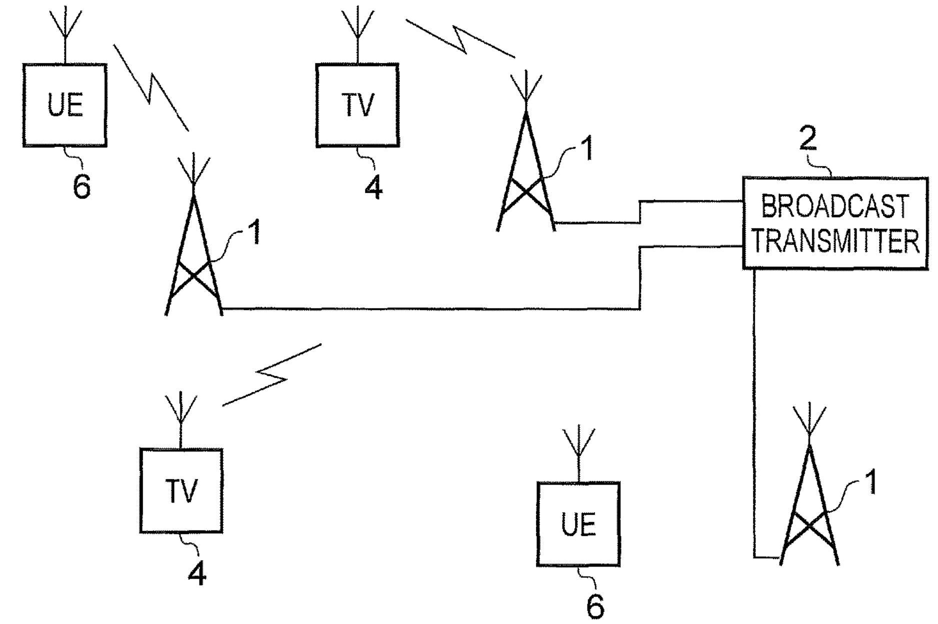

An example illustration of a television broadcast system is shown in FIG. 1. In FIG. 1 broadcast television base stations 1 are shown to be connected to a broadcast transmitter 2. The broadcast transmitter 2 transmits signals from base stations 1 within a coverage area provided by the broadcast network. The television broadcast network shown in FIG. 1 may operate as a so called multi-frequency network where each television broadcast base stations 1 transmits its signal on a different frequency than other neighbouring television broadcast base stations 1. The television broadcast network shown in FIG. 1 may also operate as a so called single frequency network in which each of the television broadcast base stations 1 transmit the radio signals conveying audio/video data contemporaneously so that these can be received by television receivers 4 as well as mobile devices 6 within a coverage area provided by the broadcast network. For the example shown in FIG. 1 the signals transmitted by the broadcast base stations 1 are transmitted using Orthogonal Frequency Division Multiplexing (OFDM) which can provide an arrangement for transmitting the same signals from each of the broadcast stations 2 which can be combined by a television receiver even if these signals are transmitted from different base stations 1. Provided a spacing of the broadcast base stations 1 is such that the propagation time between the signals transmitted by different broadcast base stations 1 is less than or does not substantially exceed a guard interval that precedes the transmission of each of the OFDM symbols then a receiver device 4, 6 can receive the OFDM symbols and recover data from the OFDM symbols in a way which combines the signals transmitted from the different broadcast base stations 1. Examples of standards for broadcast networks that employ OFDM in this way include DVB-T, DVB-T2 and ISDB-T.

Figure 2:
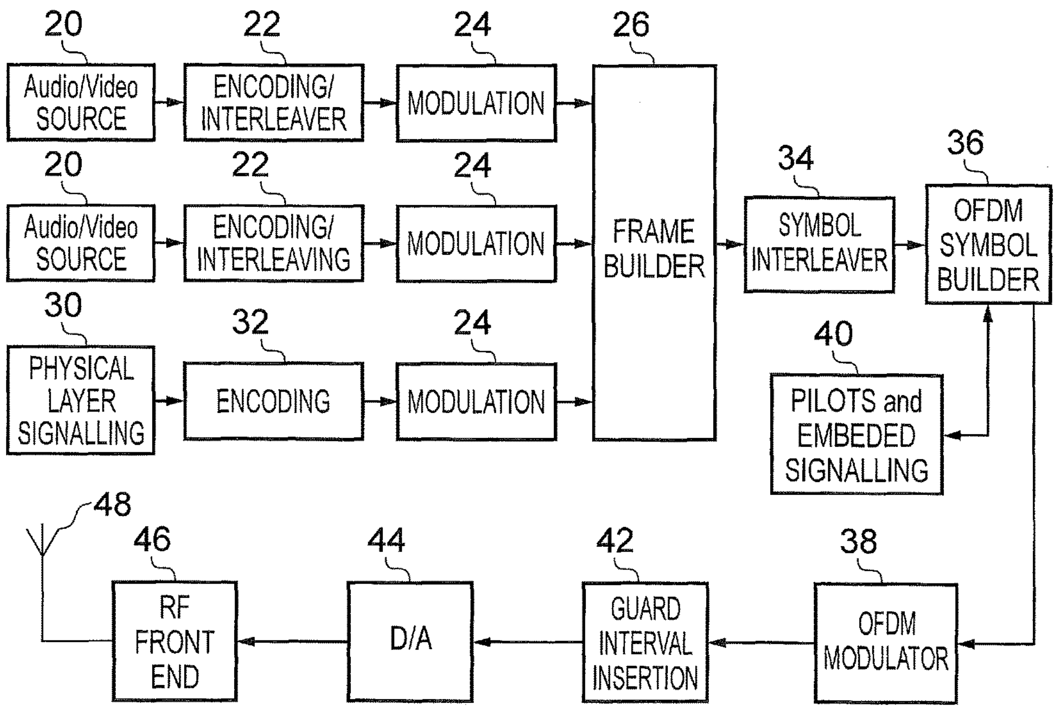
FIG. 2 provides a schematic block diagram illustrating an example transmission chain for transmitting broadcast data via the transmission network of FIG. 1.

An example block diagram of a transmitter forming part of the television broadcast base stations 1 for transmitting data from audio/video sources is shown in FIG. 2. In FIG. 2 audio/video sources 20 generate the audio/video data representing television programmes. The audio/video data is encoded using forward error correction encoding by an encoding/interleaver block 22 which generates forward error correction encoded data which is then fed to a modulation unit 24 which maps the encoded data onto modulation symbols which are used to modulate OFDM symbols. Depicted on a separate lower arm, signalling data providing physical layer signalling for indicating for example the format of coding and modulation of the audio/video data is generated by a physical layer signalling unit 30 and after being encoded by an encoding unit 32, the physical layer signalling data is then modulated by a modulation unit 24 as with the audio/video data.

A frame builder 26 is arranged to form the data to be transmitted with the physical layer signalling data into a frame for transmission. The frame includes a time divided section having a preamble in which the physical layer signalling is transmitted and one or more data transmission sections which transmit the audio/video data generated by the audio/video sources 20. A symbol interleaver 34 may interleave the data which is formed into symbols for transmission before being modulated by an OFDM symbol builder 36 and an OFDM modulator 38. The OFDM symbol builder 36 receives pilot signals which are generated by a pilot and embedded data generator 40 and fed to the OFDM symbol builder 36 for transmission. An output of the OFDM modulator 38 is passed to a guard insertion unit 42 which inserts a guard interval and the resulting signal is fed to a digital to analogue convertor 44 and then to an RF front end 46 before being transmitted by an antenna 48.

Figure 3:
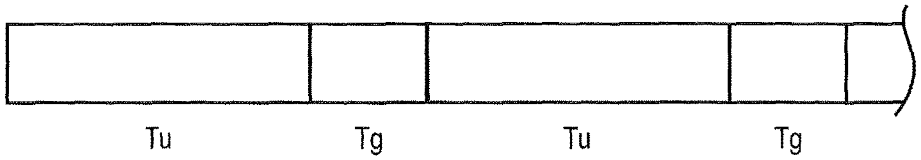
FIG. 3 provides a schematic illustration of OFDM symbols in the time domain which include a guard interval.

As with a conventional arrangement OFDM is arranged to generate symbols in the frequency domain in which data symbols to be transmitted are mapped onto sub carriers which are then converted into the time domain using an inverse Fourier Transform which may comprise part of the OFDM modulator 38. Thus the data to be transmitted is formed in the frequency domain and transmitted in the time domain. As shown in FIG. 3 each time domain symbol is generated with a useful part of duration Tu seconds and a guard interval of duration Tg seconds. The guard interval is generated by copying a part of the useful part of the symbol with duration Tg in the time domain, where the copied part may be from an end portion of the symbol. By correlating the useful part of the time domain symbol with the guard interval, a receiver can be arranged to detect the start of the useful part of the OFDM symbol which can be used to trigger a Fast Fourier Transform to convert the time domain symbol samples into the frequency domain from which the transmitted data can then be recovered. Such a receiver is shown in FIG. 4.

Figure 4:
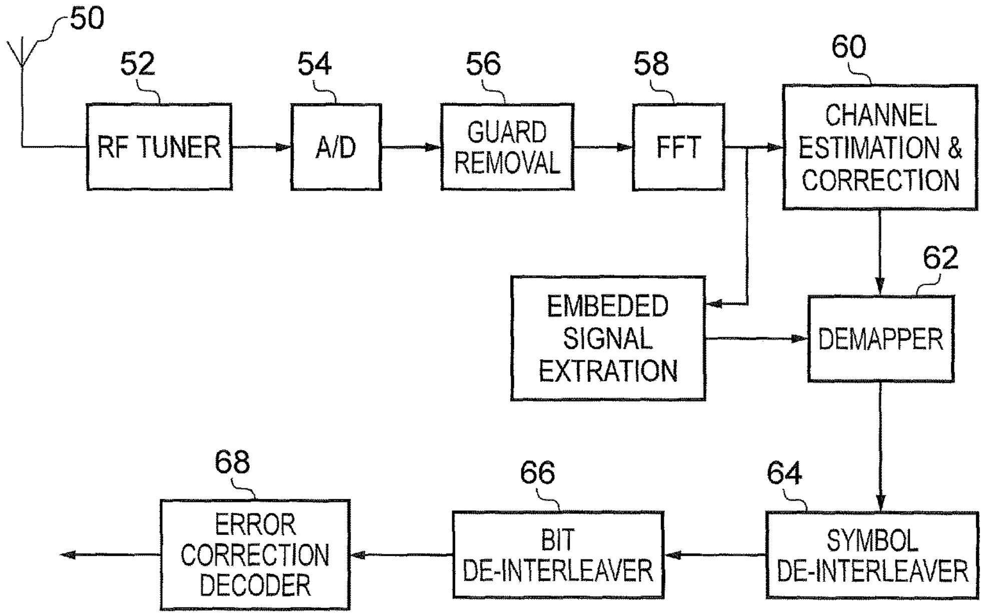
FIG. 4 provides a schematic block of a typical receiver for receiving data broadcast by the broadcast transmission network of FIG. 1 using OFDM.

In FIG. 4 a receiver antenna 50 is arranged to detect an RF signal which is passed via a tuner 52 and converted into a digital signal using an analogue to digital converter 54 before the guard interval is removed by a guard interval removal unit 56. After detecting the optimum position for performing a fast Fourier Transform (FFT) to convert the time domain samples into the frequency domain, an FFT unit 58 transforms the time domain samples to form the frequency domain samples which are fed to a channel estimation and correction unit 60. The channel estimation and correction unit 60 then estimates the transmission channel for example by using pilot sub-carriers which have been embedded into the OFDM symbols. After excluding the pilot sub-carriers, all the data-bearing sub-carriers are fed to a symbol de-interleaver 64 which de-interleaves the sub-carrier symbols. A de-mapper unit 62 then extracts the data bits from the sub-carriers of the OFDM symbol. The data bits are fed to a bit de-interleaver 66, which performs the de-interleaving so that the error correction decoder can correct errors in accordance with a conventional operation.

Framing Structure

Figure 5:
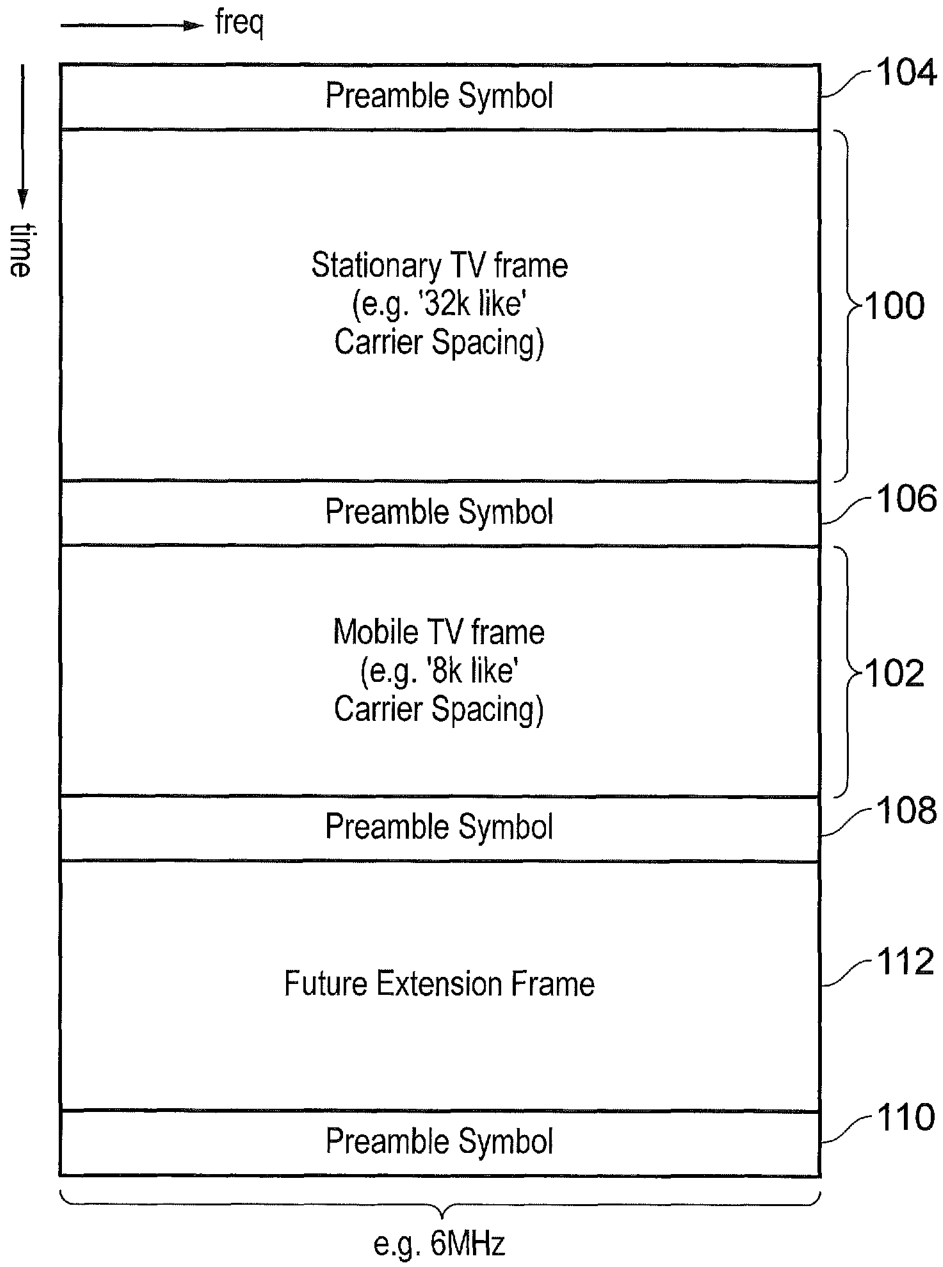
FIG. 5 provides a schematic illustration of a sequence of transmission frames for transmitting broadcast data and payload data separated by a preamble carrying signalling data.

FIG. 5 shows a schematic diagram of the framing structure of a frame that may be transmitted and received in the systems described with reference to FIGS. 1 to 4. FIG. 5 illustrates different physical layer frames, some targeted for mobile reception whilst others are targeted for fixed roof-top antenna reception. The system can be expanded in future to incorporate new types of frames, for the current system, these potential new types of frames are simply known as future extension frames (FEFs).

One requirement for fixed reception frames is an improved spectral efficiency which may be assured by such features as adopting a higher order modulation, for example 256QAM, and higher code rates, for example greater than half rate, because of relatively benign channel conditions, and a high number of sub-carriers per OFDM symbol (FFT size) such as 32K. This reduces the capacity loss due to the guard interval fraction. However, a higher number of sub-carriers can make such OFDM symbols unsuitable for mobile reception because of lower tolerance to high Doppler frequency of the received signal. On the other hand, the main requirement for mobile reception frames could be robustness in order to ensure a high rate of service availability. This can be improved by adopting such features as a low order modulation for example QPSK or BPSK, low code rates, a low number of sub-carriers per OFDM symbol (FFT size) and a high density scattered pilot pattern etc. A low number of sub-carriers for OFDM symbols can be advantageous for mobile reception because a lower number of sub-carriers can provide a wider sub-carrier spacing and so more resilience to high Doppler frequency. Furthermore a high density pilot pattern eases channel estimation in the presence of a time varying propagation channel.

The framing structure shown in FIG. 5 is therefore characterised by frames which may each include payload data modulated and encoded using different parameters. This may include for example using different OFDM symbol types having different number of sub-carriers per symbol, which may be modulated using different modulation schemes, because different frames may be provided for different types of receivers. However each frame may include at least one OFDM symbol carrying signalling data, which may have been modulated differently to the one or more OFDM symbols carrying the payload data. Furthermore for each frame, the signalling OFDM symbol may be a different type to the OFDM symbol(s) carrying the payload data. The signalling data is required to be recovered so that the payload data may be de-modulated and decoded.

Frame Preamble

To delimit frame boundaries, a frame preamble symbol such as the P1 symbol in DVB-T2 is required. The preamble symbol would carry signalling that describes how the following frame is built. It is expected that all of the types of receiver mentioned above whether for mobile or fixed reception should be able to detect and decode the preamble in order to determine whether or not they should decode the payload in the following frame.

The preamble OFDM symbol conveys signalling data whilst the OFDM symbols within the body of the transmission frame convey payload data as shown in FIG. 5. Each transmission frame shown in FIG. 5 has particular characteristics. A data bearing frame 100 carries a frame of data, which may use a higher operating mode providing a higher number of sub-carriers per OFDM symbol, for example, approximately 32 thousand sub-carriers (32 k mode) thereby providing a relatively high spectral efficiency, but requiring a relatively high signal to noise ratio to achieve an acceptable data integrity in the form of the bit error rate. The higher order operating mode would therefore be most suitable to communicate to stationary television receivers which have sensitive detection capabilities including well positioned fixed antenna for recovering audio/video data from the 32 k OFDM symbols. In contrast, the frame structure also includes a second frame 102 which is generated to be received by mobile television receivers in a more hostile radio communications environment. The frame 102 may therefore be arranged to form payload bearing OFDM symbols with a lower order modulation scheme such as BPSK or QPSK and a small or lower number of sub-carriers per OFDM symbol (FFT size) such as 8K to improve the likelihood that a mobile receiver may be able to receive and recover the audio/video data in a relatively hostile environment. In both the first frame 100 and the second frame 102 a preamble symbol 104,106 is provided which provides signalling parameters for detecting the audio/video data transmitted in the payload part of the transmission frame 100, 102. Similarly, a preamble symbol 108, 110 is provided for a future extension frame 112.

In the Applicant's co-pending UK patent application 1305795.5, arrangements for forming a preamble symbol for use with the transmission frames of FIG. 5 are disclosed. The disclosed preambles result in an improved likelihood of detecting the preamble symbol particularly in harsh radio environments. Furthermore, the framing structure shown in FIG. 5 can be devised such that the number of sub-carriers of the payload bearing OFDM symbols is different from frame to frame and furthermore, these sub-carriers may use different modulation schemes. Thus the OFDM symbols which carry the payload data may be of a different type to the OFDM symbols carrying the signalling data. An example block diagram of a part of the transmitter shown in FIG. 2 for transmitting the preamble and signalling data as disclosed in UK patent application 1305795.5 is shown in FIG. 6.

Figure 6:
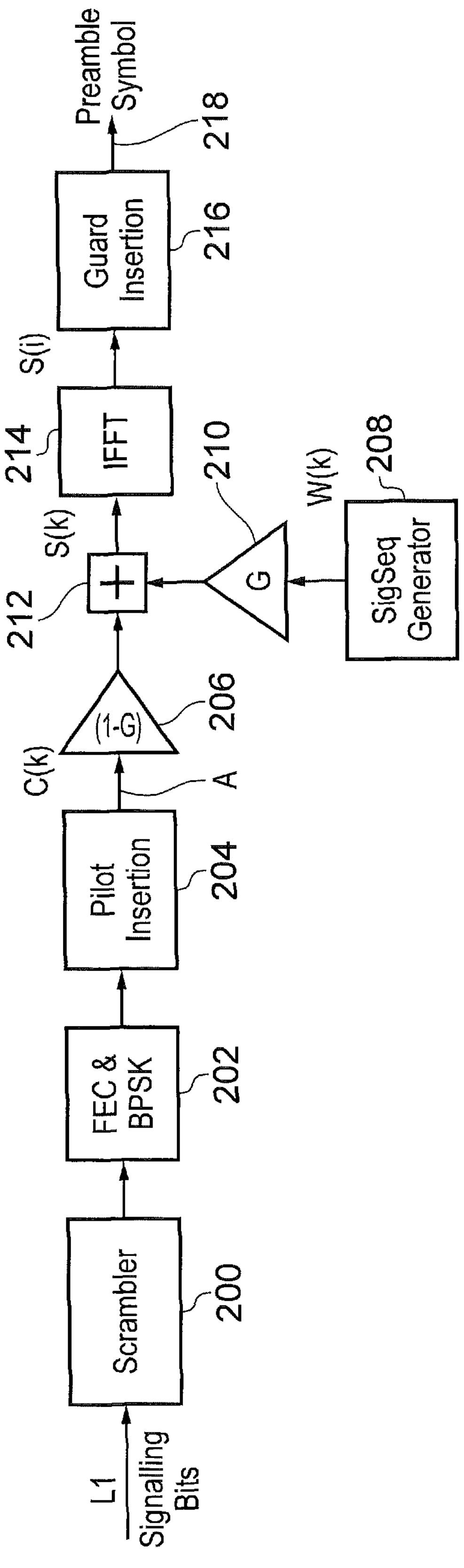
FIG. 6 provides a block diagram showing a transmitter for transmitting signalling data via a signalling or preamble OFDM symbol.

In FIG. 6 the signalling data is first fed to a scrambling unit 200 which scrambles the signalling data which is then fed to a forward error correction (FEC) and modulator unit 202 which encodes the signalling data with a forward error correcting code and then interleaves it before mapping the encoded data onto QAM modulation symbols. The QAM modulation could be π/4-BPSK, QPSK, 16QAM, 64QAM or 256QAM for example. A pilot insertion unit 204 then inserts pilots in between modulation symbols to form the OFDM symbol of the preamble 104, 106, 108, 110. The OFDM symbol forming the preamble is then scaled by a scaling unit 206 in accordance with a predetermined factor (1−G). The scaling unit 206 adapts the transmission power of the preamble with respect to a signature sequence which is combined with the OFDM symbols of the preamble before transmission so that the total transmission power of the preamble remains the same as it would have been without the signature sequence. The signature sequence generator 208 is configured to generate a signature sequence which is fed to a second scaling unit 210 which scales the signature sequence by a predetermined factor G before the scaled signature sequence is combined with the OFDM symbol of the preamble by a combining units 212. Thus the signature sequence W(k) is combined with the OFDM symbol in the frequency domain so that each of the coefficients of the signature sequence is added to one of the subcarrier signals of the OFDM symbol. The combined preamble OFDM symbol and signature sequence are then transformed from the frequency domain to the time domain by an inverse Fourier transform processor (IFFT) 214 before a guard interval insertion unit inserts a time domain guard interval. At an output of the guard insertion unit 216 the preamble symbol is formed on output channel 218.

As can be seen for the example shown in FIG. 6 the signature sequence is combined with the OFDM symbol carrying signalling data in the frequency domain so that a spectrum of the preamble symbol after combining remains within a spectral mask for the transmission channel. As will be appreciated for some examples the signature sequence may be combined with the OFDM symbol in the time domain. However other bandwidth limiting processes may then be required to be applied to the signature sequence prior to combination with the preamble OFDM symbol in the time domain which may affect the correlation properties of the signature sequence at the receiver.

In the example illustration in FIG. 6, the scrambling of the signalling data by the scrambling unit 200 ensures that the peak-to-average power ratio (PAPR) of the preamble symbol will not be excessive due to many similarly modulated OFDM sub-carriers. The scrambled signalling bits are then forward error correction encoded by the FEC and BPSK unit 202 with a LDPC code at a low code rate prior to mapping to a low order constellation within the unit 202. Although BPSK is specified in FIG. 6, a range of other modulation schemes may also be used, for example a form of QAM may be used. The pilots inserted at this stage by the pilot insertion unit 204 are not for channel estimation, but for frequency offset estimation as will be explained shortly. At this stage, a complex preamble signature sequence also composed of the same number of complex samples as the useful sub-carriers as the OFDM symbol is added to the samples of the signalling OFDM symbol by the combiner 212. After generation and before addition to the preamble OFDM symbol, each preamble signature sequence sample is scaled by a predetermined factor G, by a scaler 210 and the corresponding OFDM symbol sample is scaled by (1−G) by a scaler 206 so that the power of the composite preamble symbol should be the same as the power of the signalling OFDM symbol at point A in FIG. 6.

The IFFT 214 then forms the OFDM symbol in the time domain, which is then followed by the insertion of the guard interval by the guard insertion unit 216 which in some examples prepends the Ng samples of the preamble OFDM symbol at the start of the preamble OFDM symbol—also known as a cyclic prefix of the preamble OFDM symbol. After guard interval insertion, a preamble OFDM time domain symbol of duration Ts=Tu+Tg made up of Ns=Nu+Ng complex samples where Tu is the useful symbol period with Nu samples and Tg is the guard interval duration with Ng samples is formed.

As explained above, the preamble symbol generator of FIG. 6 generates a signature sequence which is combined with the signalling OFDM symbol (first OFDM symbol of a physical layer frame), which forms the preamble symbol of the frame, in order to allow a receiver to detect the preamble at lower signal to noise ratios compared to the signal to noise ratios which are required to detect and recover data from OFDM symbols carrying the payload data. The formation of the signature sequences generated by the signature sequence generator 208 is also disclosed in the Applicants co-pending UK patent application 1305795.5. Each signature sequence may be formed from a pair of Gold code sequences chosen because of their good auto-correlation properties, or in other example signature sequences formed from M-sequences could be used. In still other examples the sequences may be pseudo random binary sequences which are formed from linear feedback registers. Further detail of the selection of these sequences and their formation into signature sequences can be found in the Applicant's co-pending UK patent application 1305795.5 where the following example generator polynomials for the definition of the linear feedback register for the real and imaginary components are also given.

TABLE 1

Generator polynomials for complex signature sequence.

| Sequence Name | Generator polynomial |
|---|---|
| R_seq1 ($I_0(x)$) | $x^{13}+x^{11}+x+1$ |
| R_seq2 ($I_1(x)$) | $x^{13}+x^{9}+x^{5}+1$ |
| I_seq1 ($Q_0(x)$) | $x^{13}+x^{10}+x^{5}+1$ |
| I_seq2 ($Q_1(x)$) | $x^{13}+x^{11}+x^{10}+1$ |

For the linear feedback shift registers the initialising values for the shift register stages to initiate generation of each of the sequences $G_0(n)$ or $G_1(n)$ at the start of each preamble symbol are presented in the table below:

| Sequence | I or Q | Initialisation (LSB first) |
|---|---|---|
| $G_0(n)$ | I | 1111111111111 |
| | Q | 1110111011111 |
| $G_1(n)$ | I | 0110110110111 |
| | Q | 0101010101010 |

As shown in FIG. 6, the scaler 210 multiplies the signature sequence by a factor G and the scaler 206 multiplies the signalling OFDM symbol by a factor 1−G. As such, if the time domain signalling OFDM symbol signal is c(n) while the signature sequence signal is f(n), then the composite transmitted preamble symbol s(n) is given by:

$$s(n)=(1-G)c(n)+Gf(n)$$

where G is the scaling applied to the signature sequence. The signature signal effectively adds distortion to the signalling OFDM symbol thereby increasing the bit error rate of the signalling OFDM symbol at the receiver. Furthermore, with a normalised power of 1, the composite symbol in effect distributes power between the signature sequence signal and the signalling OFDM symbol signal. With a high value for G, the signature signal has more power and so frame synchronisation (detection of the preamble) at the receiver should be achieved at a lower signal to noise ratio. However, reducing the power of the signalling OFDM symbol (in order to increase the power of the signature sequence signal) also means that error-free decoding of the signalling information itself becomes more difficult at the receiver as the signal-to-noise of the signalling OFDM symbol has fallen. Therefore, an optimum value for G has to be a compromise between these conflicting aims. We can further define P=(1−G)/G which is proportional to the power ratio between the signalling OFDM symbol and the signature signal. An appropriate value for G can be set by experimenting with this power ratio P.

Determining a Suitable Guard Interval Fraction

According to example embodiments of the present technique, the same preamble symbol will delimit physical layer frames meant for both fixed and mobile reception. In the following analysis it is assumed that a broadcast transmission system, which has both types of transmission frames will be used. As such one of the principal factors affecting the reception of payload data bearing OFDM symbols transmitted for fixed reception is spectral efficiency. As explained above, this means the use of large numbers of sub-carriers for the OFDM symbols and correspondingly large FFT sizes because a smaller guard interval fraction (GIF) can be used to get a large guard interval duration (GID). A large GID can allow a broadcast system to have a greater separation between broadcast transmitters and can operate in environments with a greater delay spread. In other words the broadcast transmission system is configured with a wider spacing between transmitters forming a larger single frequency network (SFN). A detailed analysis of the selection of a suitable guard interval fraction can be found in the Applicant's co-pending UK patent application 1305795.5 where the following possible guard interval fractions were proposed. In a 6 MHz channel raster system in which for example DVB-T2 is transmitted, an OFDM symbol having substantially four thousand sub-carriers (4K) OFDM symbol has a duration of only 2*224*8/6=597.33 us. On the other hand, the longest delay spread in the network is 709.33 us (the longest GID for 32K, 19/128 GIF) even with a GIF=1, it is not possible to get a GID of 709.33 us with a 4K OFDM symbol. A table below lists possible operating modes that are receivable in medium to high Doppler frequencies (for the mobile environment) and some possible guard intervals. Accordingly, for this example an appropriate signalling OFDM symbol is an 8K symbol with a GID of 19/32, but in other examples a GIF of 57/128 may be used so that the resulting GID is equivalent to that of a 32 k symbol with a GIF of 57/512.

TABLE 2

Mobile FFT modes and their possible guard intervals

| FFT Size | Tu in 6 MHz (us) | GIF | GID (us) | Ts (us) |
|---|---|---|---|---|
| 4K | 597.33 | 1 | 597.33 | 1194.667 |
| | | 1/4 | 298.67 | 1493.338 |
| 8K | 1194.67 | 1/2 | 597.33 | 1792.005 |
| | | 19/32 | 709.33 | 1904.000 |
| | | 3/4 | 896.00 | 2090.638 |

Frequency Offset Considerations

At first detection, the signalling or preamble OFDM symbol may have to be decoded in the presence of any tuning frequency offsets introduced by tuner 52. This means that either the signalling data should be modulated onto the preamble OFDM symbol in a manner that reduces the effects of any frequency offsets or resources are inserted into the preamble symbol to allow the frequency offset to be estimated and then removed prior to preamble decoding. In one example the transmission frame may only include one preamble OFDM symbol per frame so the first option is difficult to achieve. For the second option, additional resources can be in the form of frequency domain pilot subcarriers, which are inserted into the OFDM so that these can be used to estimate the frequency offset and common phase error. The frequency offsets are then removed before the symbol is equalised and decoded. In a similar vein to the insertion of pilots into the data payload bearing OFDM symbols, embodiments of the present technique can be arranged to provide within the signalling (preamble) OFDM symbol pilot sub-carriers, which can allow for the estimation of frequency offsets that are larger than the preamble sub-carrier spacing. These pilots are not spaced regularly in the frequency dimension to avoid instances when multipath propagation may result in regular nulls of the pilots across the full preamble OFDM symbol. Accordingly, 180 pilot sub-carriers can be provided across the 8K symbol with the positions defined apriori. The sub-FFT bin frequency offset is estimated via the detection of the preamble OFDM symbol itself. Accordingly embodiments of the present technique can provide a preamble OFDM symbol in which the number of sub-carriers carrying pilot symbols is less than the number which would be required to estimate a channel impulse response through which the preamble OFDM symbol is transmitted, but sufficient to estimate a coarse frequency offset of the transmitted OFDM symbol.

Preamble Detection and Decoding at the Receiver

Figure 7:
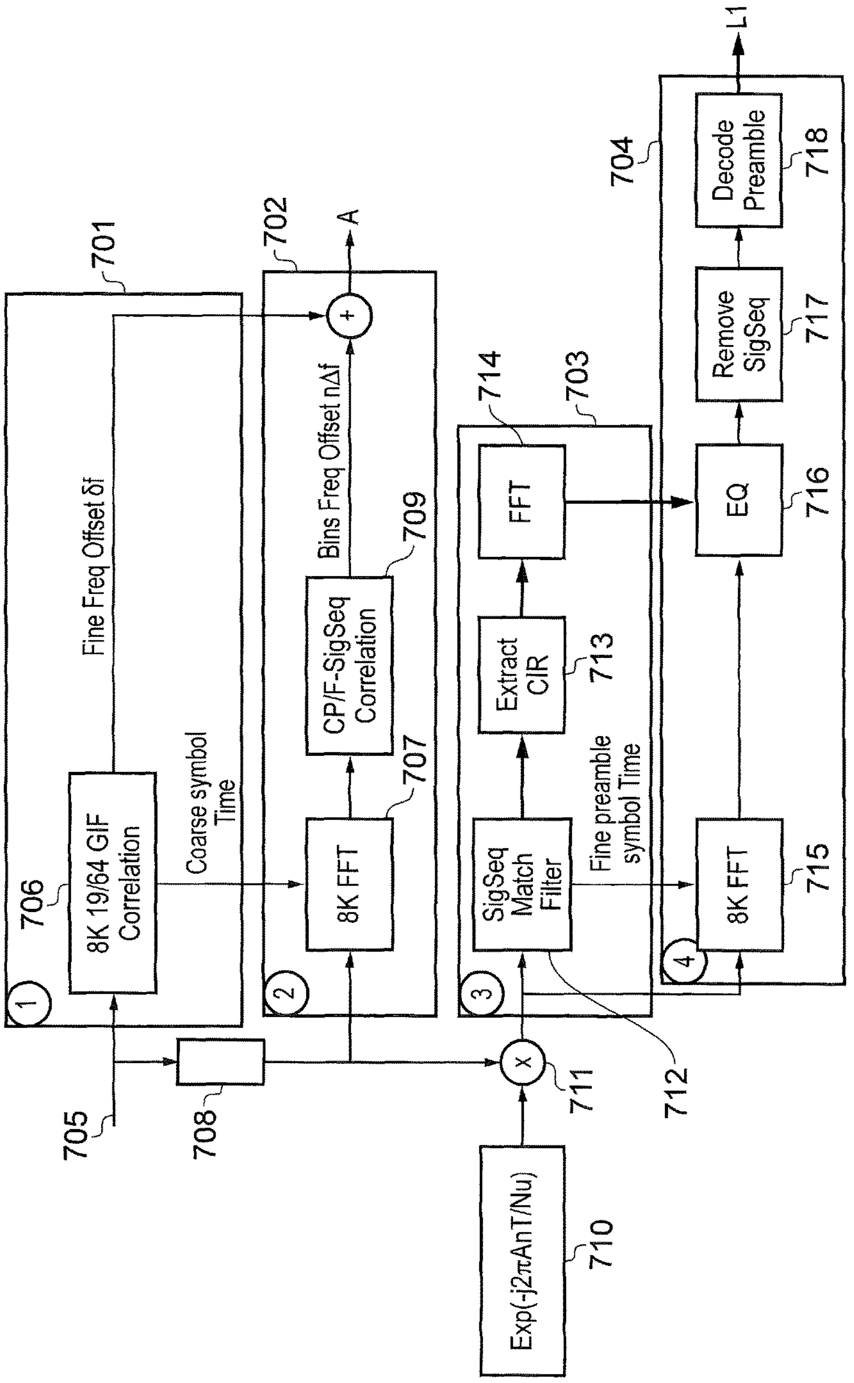
FIG. 7 provides a schematic diagram showing a receiver for receiving signalling data via signalling or preamble OFDM symbol.

A portion of a receiver which is for the reception and detection of the above described signalling data that is combined with a signature sequence is illustrated in FIG. 7, where all numerical values are for example only. The receiver comprises four main processing stages or elements 701 to 704, each of which provides information required for the operation of a subsequent processing stage. A signal received from an antenna is converted to a sampled time domain baseband signal and input via an input 705 into the first processing stage 701, which comprises a guard interval correlator 706. The guard interval correlator 706 correlates the guard interval of the preamble with a portion of the received signal in order to obtain a fine frequency offset estimation but also a coarse symbol time which is used to determine the starting point in time of the fast Fourier transform (FFT) window of the next processing stage 702. Within processing stage 702 a fast Fourier transformer 707 performs an FFT on the received signal which has been stored in memory 708, where the start point of the FFT window is adjusted according to the coarse symbol timing obtained by the guard interval correlator 706. The frequency domain signal out from the Fourier transformer is input to a signature sequence correlator 709 which obtains a coarse frequency offset in terms of FFT bins. This coarse frequency offset information is combined with the fine frequency offset information obtained by the guard interval correlator to arrive at a frequency offset 'A'. The frequency offset A is then used to correct the frequency offset present in the received signal via a complex multiplication 711 between an output of a local oscillator 710 and the received baseband signal during processing stage 703. The frequency corrected received signal is then matched filtered by a signature sequence matched filter 712, which is populated with the coefficients of the predetermined time-domain version of the signature sequence, and a channel impulse response extracted from the output signal by a channel impulse response (CIR) extractor 713. The CIR is then transformed into the frequency domain by a Fourier transformer 714 and used for equalisation. The signature sequence matched filter 712 also provides a fine preamble symbol timing which is then used to correctly position the FFT window of the Fourier transformer 715 which transforms the frequency corrected received signal into the frequency domain. The fine preamble symbol timing is indicated by an impulse like-peak in the output of the matched filter 712 where further detail on the implementation of the matched filter may be found in the Applicant's co-pending UK patent application 1305795.5. Frequency domain equalisation is then performed on the frequency domain received signal by the equaliser 716 using the channel transfer function derived by applying the FFT 714 to the CIR. Finally the signature sequence is removed from the received signal by a signature sequence remover 717 and the signalling data decoded from the preamble by a preamble decoding unit 718.

Signature Sequence Messages

As disclosed in the Applicant's co-pending UK patent application 1305795.5, as well as utilising the signature sequence for the provision of a CIR and fine preamble symbol timing in harsh radio environments, the choice of signature sequence may also be used to convey information or a message. For instance, by selecting a signature sequence from a set of signature sequences the selection of the signature sequence may convey information, such as an indication of a presence of an absence of an active early warning signal (EWS) within the signalling data or payload. This indication may be received at the receiver by detecting which signature sequence from the set of possible signature sequences has been combined with the signalling data.

Figure 8:
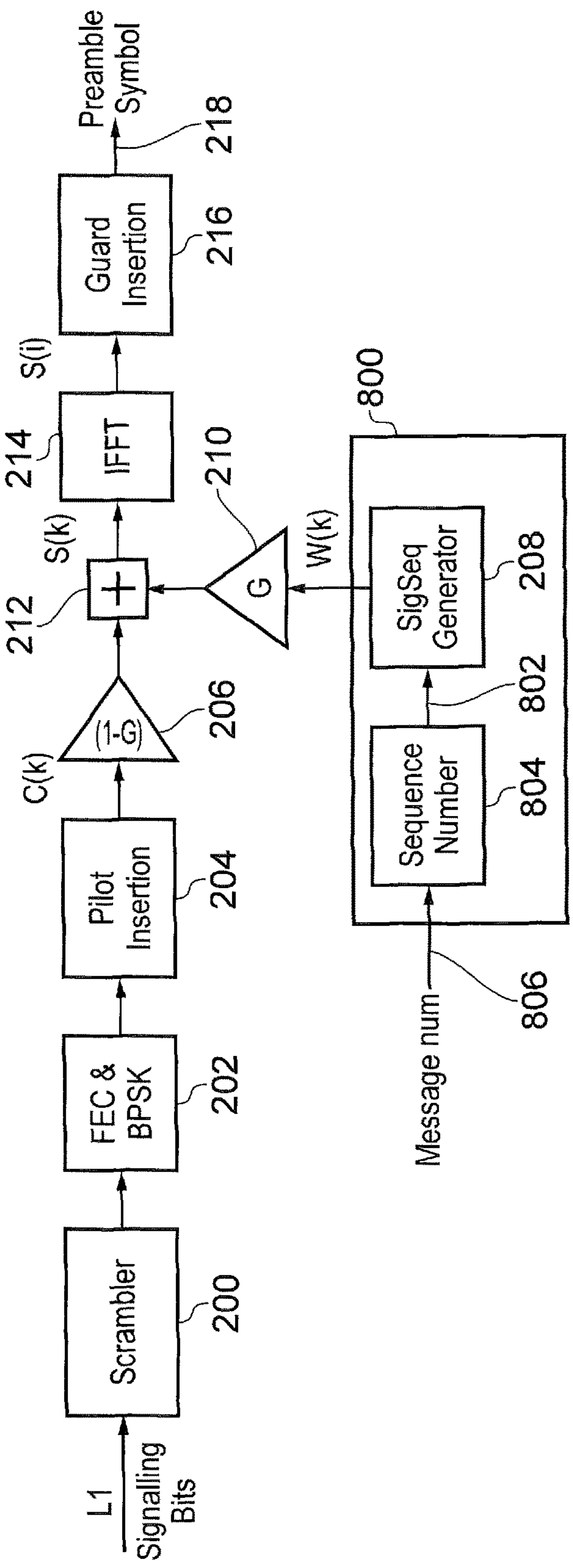
FIG. 8 provides a schematic diagram showing a transmitter for transmitting signalling data via a signalling or preamble OFDM symbol and transmitting a message via a choice of signature sequence.

FIG. 8 illustrates the transmitter presented in FIG. 6 but with an adaptation to enable the signature sequence to convey additional data or messages. Since the transmitter of FIG. 8 is based on the transmitter illustrated in FIG. 6 where like parts have the same reference numerals, only the differences shall be explained.

As illustrated in FIG. 8, the signature sequence generator 208 forms part of a signature sequence processor 800, which includes the signature sequence generator 208 a sequence number controller 804. The input 802 to the signature sequence generator 208 receives the output from the sequence number controller 804. The sequence number controller input 806 represents the message that the transmitter would like to convey to receivers within the network. The signature sequence generator 208 is configured to be able to generate one of N+1 possible sequences. A given number $0 \le i \le N$ on the input 802 of the signature sequence generator 208 causes the signature sequence generator 208 to output the sequence whose cardinal number is i from amongst its set of signature sequences. The output of one or other of the signature sequences from generator 208 conveys a pre-determined message to all receivers in the network that receive the signal. In one example the message represents an EWS.

The signature sequence generated by the signature sequence generator 208 is one of a predetermined set of sequences which represent as many messages as there are signature sequences generated by the signature sequence generator 208. In order to communicate each of these messages, the message number of input 806 is arranged to be the required signature sequence number which the signature sequence generator 208 uses to select one of the signature sequences from its predetermined set of signature sequences. The selection of the signature sequence is therefore representative of a different one of a corresponding predetermined set of messages which thereby conveys information which may be a particular warning message, such as a tsunami warning or may be a message for a different purpose. Each message can provide different information. For example in a N=4 message system, message 1 could be an early warning of a possible emergency situation, such as an approaching hurricane or tsunami while message 2 could be an indication of an all-clear prior to the normal state represented by message 0 which requires no particular action. The early warning signal could trigger the receiver to display a message or audible warning instructing users of the device to evacuate a building for example. Thus a receiver could detect the message 1 and generate audible or visual output to the users to provide a warning. Similarly messages message 3 and message 4 could provide similar broadcast information, such as public safety announcement, radio traffic announcements or flooding. As will be understood, the choice of sequence thereby represents one of the messages selected and therefore conveys information.

For example, when there is need to convey an EWS to all receivers, the input 806 to the signature sequence processor 800 carries a 1. Accordingly, the sequence number controller 804 outputs '1' onto input 802 of the signature sequence generator 208 which causes the signature sequence generator 208 to generate an 'EWS On' signature sequence which is one of the set of signature sequences and output this to the gain block 210. When there is no EWS to be conveyed, the input 806 to the signature sequence processor 800 carries a '0'. Accordingly, the sequence number controller 804 outputs '0' onto input 802 of the signature sequence generator 208 which causes the signature sequence generator 208 to generate an 'EWS Off' signature sequence which is one of the set of signature sequences and output this to the gain block 210. In this example, all receivers within the network detecting signature sequence corresponding to input '1' and the 'EWS On' signature sequences determine that this represents an EWS, further information about which may be carried as part of the Layer 1 signalling data and/or in the payload of the frame. The receiver can then take further action to decode and interpret the emergency information. On the other hand, receivers detecting signature sequence number zero would determine that there are no current emergencies imminent and so continue to decode and display the audio-visual information in the payload of the frame.

Figure 9:
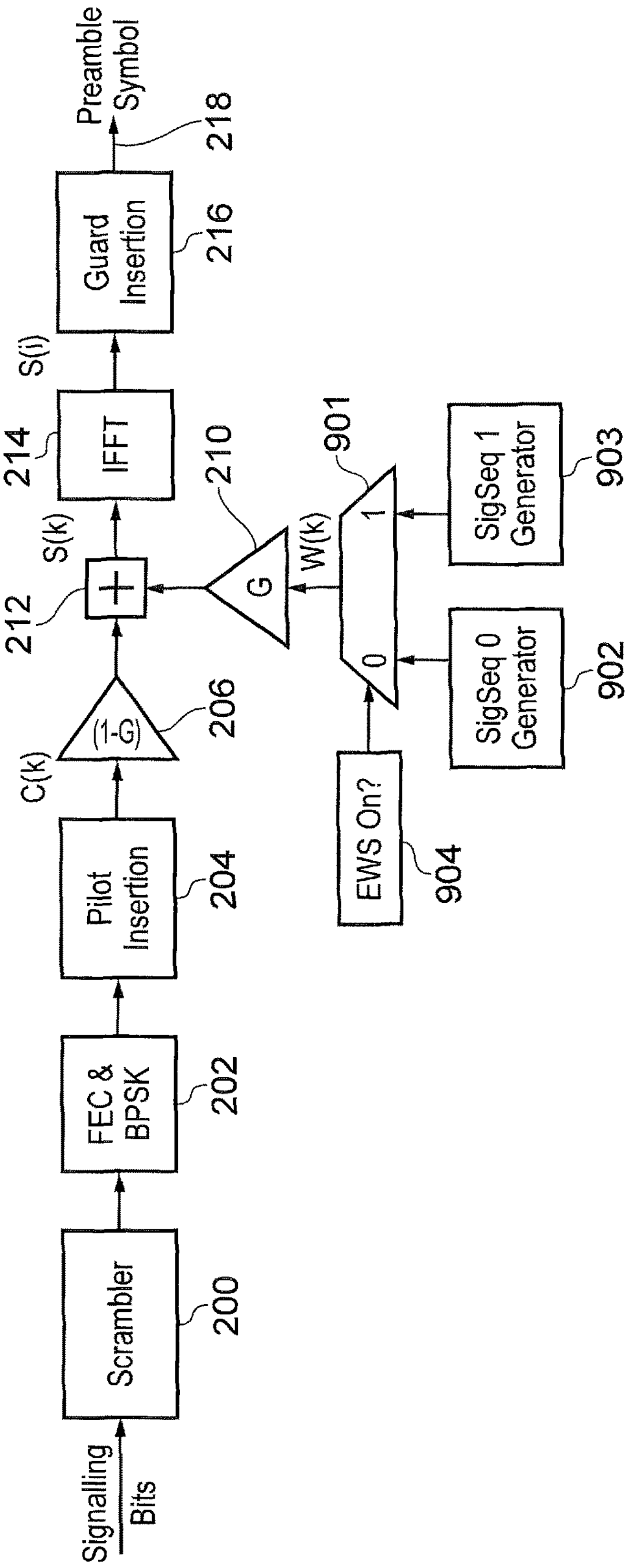
FIG. 9 provides a schematic diagram showing a transmitter for transmitting signalling data via a signalling or preamble OFDM symbol and transmitting a message via a choice one of two signature sequences.
Figure 10:
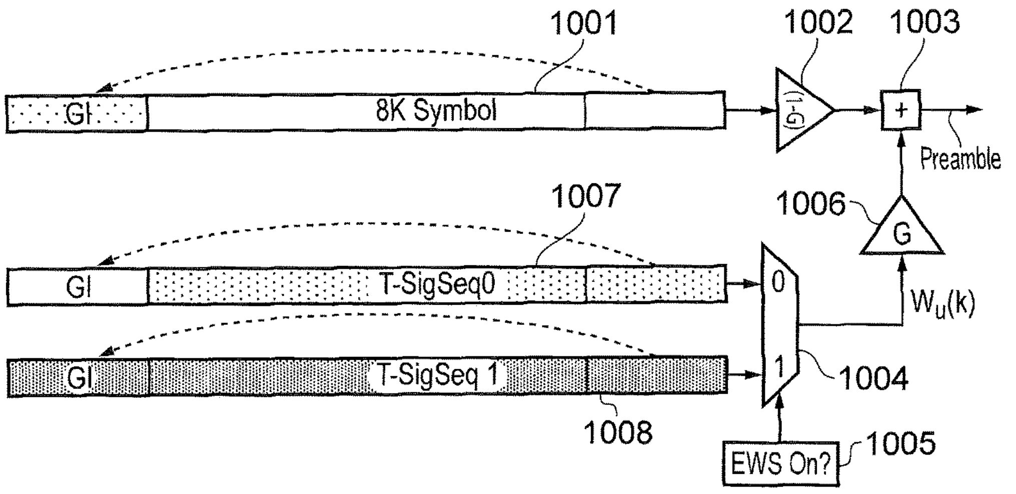
FIG. 10 provides a schematic diagram showing a transmitter for transmitting signalling data via a signalling or preamble OFDM symbol and transmitting a message via a choice of signature sequence in a preamble OFDM symbol as may be conceived in the time domain.

FIG. 9 illustrates the transmitter presented in FIG. 8 which has been adapted for operation with an EWS ON and OFF signal. The signature sequence W(k) which is added to the signalling OFDM symbol by the adder 212 is output from a multiplexer 901 and may either be a signature sequence generated by a signature sequence generator 902 or a signature sequence generated by a signature generator 903, however the different signature sequences may also be generated by a single generator. The control of which signature sequence is passed to the adder is provided by the EWS unit which indicates to the multiplexer which signature sequence to pass to the adder. For example, if there is an impending disaster the EWS unit 904 would provide a signal to the multiplexer which configures the multiplexer to provide a signature sequence which indicates the presence of a EWS in the signalling or payload data FIGS. 8 and 9 show the insertion of one of a set of signature sequences in the frequency domain. FIG. 10 provides a schematic diagram of signature sequence insertion elements of a transmitter when the signature sequence insertion is performed in the time domain according to the operation disclosed in the Applicants co-pending UK patent application 1305795.5. The signalling OFDM symbol has been transformed into the time domain to form the symbol 1001. The symbol 1001 is then scaled by the scaling factor (1−G) by a time domain scalar or multiplier 1002. The scaled signal is then added or combined to a time domain signature sequence signal by the adder or combiner 1003. As in FIG. 9, a multiplexer 1004 under the control of a EWS signal supplied by an EWS unit 1005 is utilised to supply the different signature sequences to the scalar or multiplier 1006 which scales the signature sequence by G. Depending on the presence of a EWS signal, either the time domain signature sequence represented by 1007 (EWS Off) or 1008 (EWS On) is combined with the signalling symbol 1001 to form the final time domain preamble. As shown in FIG. 10, the time domain signature sequences and signalling data have a conventional cyclic prefix or guard interval introduced prior to combining and therefore a dedicated guard interval unit is not required after the signature sequence has been combined with the signalling symbol. However, a time domain guard interval processor may therefore be required prior to the combiner in order to introduce a guard interval in the signalling symbol and the signature sequences prior to combining.

Figure 11:
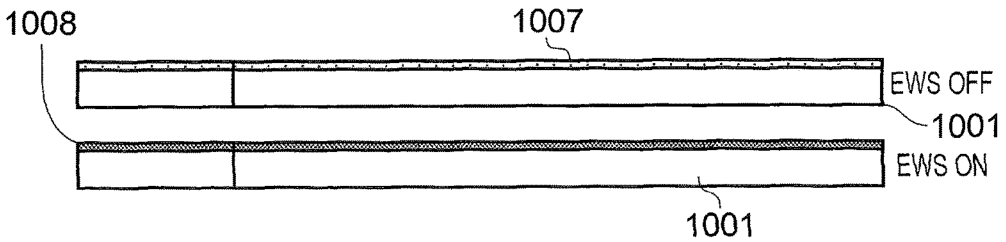
FIG. 11 provides a schematic diagram showing a preamble for transmitting signalling data and a message via a choice of signature sequence in a preamble OFDM symbol.

FIG. 11 provides a schematic illustration of the preamble in the time domain once the signalling data symbol has been combined with a signature sequence by either of the transmitter elements of FIGS. 8 to 10. In FIG. 11 G<1 and therefore the signature sequence is at a significantly lower power than the signalling data.

Improved Messaging Arrangement with Signature Sequences

As described above, in order to receive a message conveyed by the selection of a signature sequence, a receiver needs to detect which signature sequence from a set of signature sequences has been combined with the signalling symbol. For example, if signature sequence 1 of a set of two signature sequences is detected this may indicate for instance that there is an active emergency warning signalling in the signalling data or payload data. The determination of the signature sequence combined with the signalling data symbol may be performed in processing stage 703 of the receiver of FIG. 7 where the signature sequence matched filtering takes place. In examples where only a single signature sequence may be combined with signalling data symbol only a single matched filter is required. However, where more than one different signature sequences may be transmitted a matched filter corresponding to each of the possible signature sequences is required. Peak/pulse detection or thresholding may then be performed on the output of each of the matched filters to detect which signature sequence has been transmitted. Thus if a peak is detected in the output of a matched filter corresponding to signature sequence 1, it can be determined that signature sequence 1 was combined with the signalling symbol and the message conveyed by the selection of signature sequence 1 is received.

Figure 12:
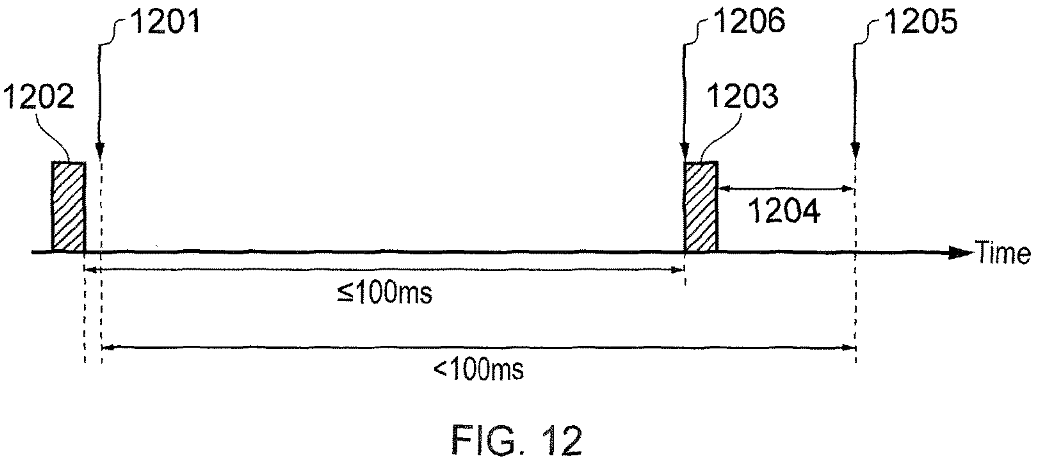
FIG. 12 provides a diagram showing a possible sequencing of transmission and reception of early warning signals transmitted via a choice of signature sequence in a preamble OFDM symbol.

Although performing transmission and reception in the above described manner enables additional information to be conveyed by the signature sequence, there may be a number of associated disadvantages. The use of signature sequences to convey an indication of a message enables an EWS to be rapidly distributed to a wide range of devices. However, in terms of earthquake warning signals for example, the time taken for an EWS to be received and decoded is critical because of the short period of time between an earthquake warning (arrival of the primary seismic waves P-waves) and the arrival of the destructive secondary seismic waves (S-waves). Consequently, the position of the signature sequence detection at the third stage of the receiver of FIG. 7 may introduce unacceptable delays. A second case of a delay which is introduced into the EWS reception process, is that the EWS indication is only being conveyed by the preamble of a frame. For instance, as shown in FIG. 12, imagine that the detection of an impending earthquake takes place at a seismograph station at time 1201, just after preamble 1202. Consequently, an EWS will not be transmitted until the next preamble 1203 is transmitted, thus a significant delay may have been introduced. It is critical that this time is reduced in order to reduce the overall time for detection of the EWS signal after, for example, primary waves (P-waves) are detected. In order to reduce this time, the period between preambles may be reduced. For instance, in some earthquake early warning systems a maximum period of time between detection of an earthquake 1201 and the detection of an EWS at a receiver 1205 is specified, for example 100 ms as shown in FIG. 12. Consequently, in this example the frequency of preamble transmission should be equal to or preferably below 100 ms so that the period of time between 1201 and 1206 is below 100 ms. Furthermore, as described above there will also be a subsequent delay 1204 until the EWS signal is detected 1205 at the receiver because of the processing delays inherent in all the processes before the matched filtering of the signature sequences in the receiver of FIG. 7. In order to reduce this delay it may be advantageous to also reduce the processing time before detection of the transmitted signature sequence at the receiver. A reduction in processing time at the receiver may also in some examples allow the time between preambles to be increased and therefore system capacity increased whilst remaining within the specified EWS detection time limits.

As well as the temporal disadvantages associated with the previously described techniques and receivers, there may also be disadvantages associated with the complexity of the processing required at the receiver and power consumption at the receiver. Firstly, in processing stage 703 a matched filter is required for each signature sequence of the set of signature sequences and therefore increased memory and an increased number of arithmetic operations will be required as the set of signature sequences increases. For example, the signature sequences may be 8192 samples in length, therefore if there are two signature sequences in the set of signature sequence double this number of arithmetic and memory elements may be required. Secondly, in applications such as broadcast television, it may be required that a television continues to receive and monitor transmitted signals for messages such as an EWS even if the television is in standby mode. Consequently, it would be beneficial to reduce the power consumption of the receiver when it is solely detecting which signature sequence has been transmitted. In the previously described receiver, the processing stages 701, 702 and 703 are required to operate if the television is to monitor for EWS even though when in standby mode many of the processes performed in processing stages 701 to 703 are redundant because they produce information for the reception and decoding of the signalling and payload data. Consequently, if the received signals are to be continually monitored for the presence of an EWS-on signature sequence, it may also be beneficial in terms of energy consumption if the later processing stages of the receiver were not required to be operational. Energy saving measures such as these may also be beneficial in scenarios where software updates are transmitted during periods where a receiver such as a television set is in a standby mode. For instance, a television set could be instructed to exit standby mode when an appropriate signature sequence is transmitted and begin decoding signalling and payload data in order to receive the software updates. Energy saving measures such as these may also be highly beneficial in scenarios where the TV receiver is a battery powered device such as a mobile phone.

Guard Interval Matched Filtering

Figure 13:
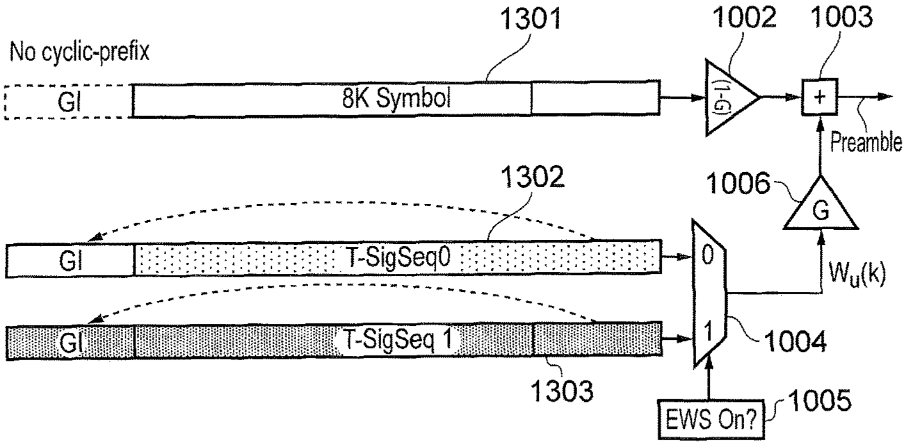
FIG. 13 provides a schematic diagram showing a transmitter in accordance with an embodiment of the present technique for transmitting signalling data via a signalling or preamble OFDM symbol and transmitting a message via a choice of signature sequence in a guard period of a preamble OFDM symbol as may be conceived in the time domain.

FIG. 13 provides a schematic diagram of the equivalent time domain processing in a transmitter in accordance with an embodiment of present technique. The elements of the transmitter of FIG. 13 are substantially similar to those of FIG. 10, however, the signals and symbols which they combine differ. Time domain signalling data symbol 1301 no longer includes a guard interval. Instead a guard interval is provided by the signature sequence which is to be combined with the signalling data symbol to form a preamble. As can be seen in FIG. 13, the guard interval of the signature sequences is formed as a cyclic prefix by replicating an end portion of the respective signature sequence and placing it at the front of the signature sequence. When an indication of an EWS is to be transmitted, the signature sequence signal 1303 is combined with the signalling symbol 1301 and when an indication of an EWS is not to be transmitted, the signature sequence signal 1302 is combined with the signalling symbol 1301. A consequence of this new arrangement of the guard interval and signature sequences is that an indication of which signature has been combined with the signalling data symbol is present in the guard interval. Consequently, as is explained in further detail below, only the fraction of the signature sequence in the guard interval is required to be detected in order to establish which signature sequence from a set of signature sequences has been combined with signalling symbol. Although the above described embodiment has been described with regard to EWS, the message conveyed by the selection of signature sequence and therefore the guard interval may be of any appropriate sort, for instance an automatic start-up command or an indication that software updates are to be transmitted.

Figure 14:
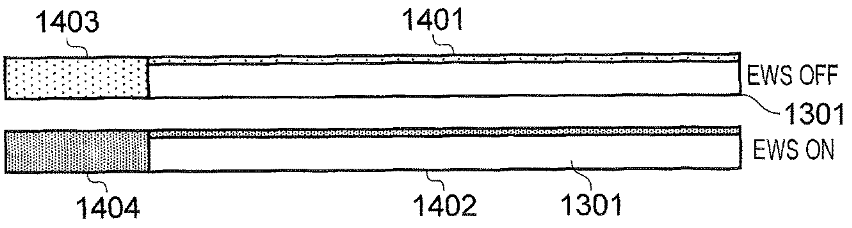
FIG. 14 provides a schematic diagram showing a preamble in accordance with an embodiment of the present technique for transmitting signalling data and a message via a choice of signature sequence in a guard period of a preamble OFDM symbol.

FIG. 14 provides an illustration of the preamble formed by the transmitter of FIG. 13 when an EWS-off signature sequence is transmitted 1401 and when an EWS-on signature sequence is transmitted 1402. It can be seen that the guard intervals 1403 and 1404 of the preambles are formed from a portion of the signature sequence as opposed the signalling data as is the case in the transmitter described with reference to FIG. 10.

Figure 15:
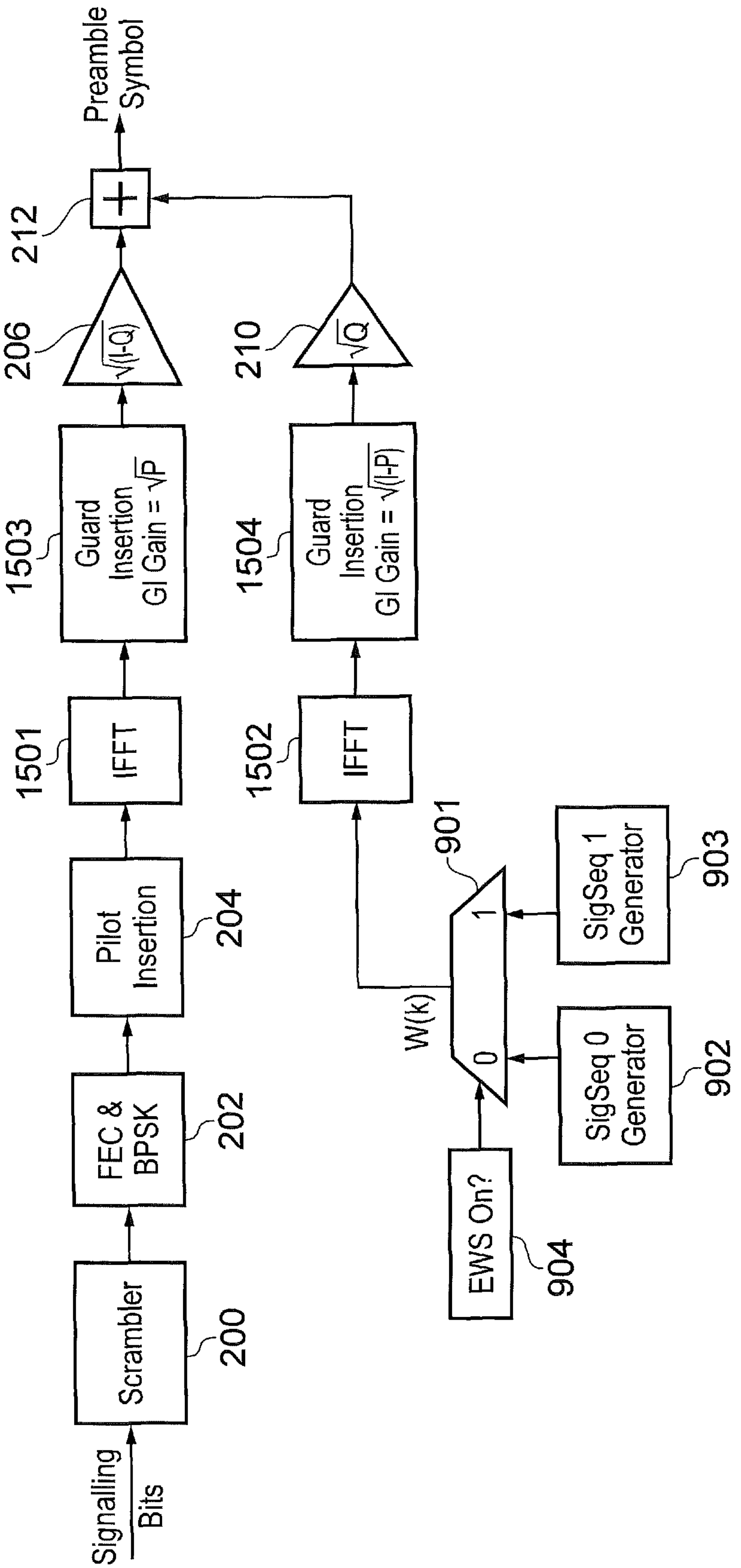
FIG. 15 provides a schematic diagram showing a transmitter in accordance with an embodiment of the present technique for transmitting signalling data via a signalling or preamble OFDM symbol and transmitting a message via a choice of signature sequence in a guard period of a preamble OFDM symbol.

FIG. 15 provides a frequency domain implementation of the transmitter in accordance with the embodiment illustrated in FIG. 13. The elements of the transmitter are substantially similar to those of FIG. 9, however, there are a number of differences arising from the need to form the guard interval from the selected signature sequence. In particular inverse Fourier transformers 1501 1502 are required to transform the signalling symbol and the selected frequency domain signature sequence into the time domain prior to insertion of guard intervals by the guard interval inserters 1503 1504. However, as shown in FIGS. 13 and 14, in some examples a cyclic prefix may not be inserted in to the guard interval preamble symbol.

Another difference of the transmitter shown in FIG. 15, with respect to the example shown in FIG. 13, is that the gain of the respective samples of the signature signal and the samples of the cyclic prefix of the OFDM symbol in the guard interval and the equivalent gains within the useful part of the preamble symbol which is carrying the signalling data may be set independently. Accordingly the gain for the samples in the guard interval and the useful part of the symbol are set with respect to factors Q and P. As such, for example, samples which are formed from combining the cyclic prefix of the time domain 8K preamble OFDM symbol c(n) with the samples of the time domain signature sequence, which may be for example one of the signature sequences $g_0(n)$ or $g_1(n)$, may be expressed for each sample of the guard interval s(n) for n=0, 1, . . . , Ng−1 as the following equation:

$$s(n)=\sqrt{(1-P)}g_x(N_u-N_g+n)+\sqrt{P}c(N_u-N_g+n) \text{ for } 0\le n<N_g$$

Whereas the samples of the OFDM symbol carrying the signalling data (useful part of the OFDM symbol) may be expressed for each sample as the equation:

$$s(n)=\sqrt{Q}g_x(n-N_g)+\sqrt{(1-Q)}c(n-N_g) \text{ for } N_g\le n<N_s$$

Where $g_x$ implies either of $g_0$ or $g_1$ and for example P and Q are close to zero, Nu=8192, Ng=3648 and Ns=Nu+Ng=11840. In one example, the factor Q is set such that 10 log [(1−Q)/Q]=10 dB while P is set such that 10 log [(1−P)/P]=8 dB=G. This means that (Q, P)=(0.090909091, 0.136806889). In yet another example P is set such that P=0.

According to the above expressions for the samples of the signature sequence and those of the OFDM symbol carrying the signalling data, the relative gain for guard interval samples are $\sqrt{P}$ for the OFDM cyclic prefix and $\sqrt{1-P}$ for the signature sequence cyclic prefix, while the gain provided by the scaler 206 for the OFDM symbols samples is $\sqrt{1-Q}$ and the scaler 210 for the signature sequence is $\sqrt{Q}$. When P=0, the preamble guard interval only contains samples of the cyclic prefix of the signature sequence and none from the cyclic prefix of the OFDM symbol.

In one example therefore the preamble guard interval may have the same duration as the longest possible guard interval in the system being 57/512 for the 32K OFDM symbol. This is equivalent to a 57/128 guard interval fraction for the 8K preamble OFDM symbol. This guard interval therefore comprises 8192*57/128=3648 samples. These samples are formed from combining the cyclic prefix of the time domain 8K preamble OFDM symbol c(n) to that of either of the time domain signature sequences $g_0(n)$ or $g_1(n)$.

Example Receiver

Figure 16:
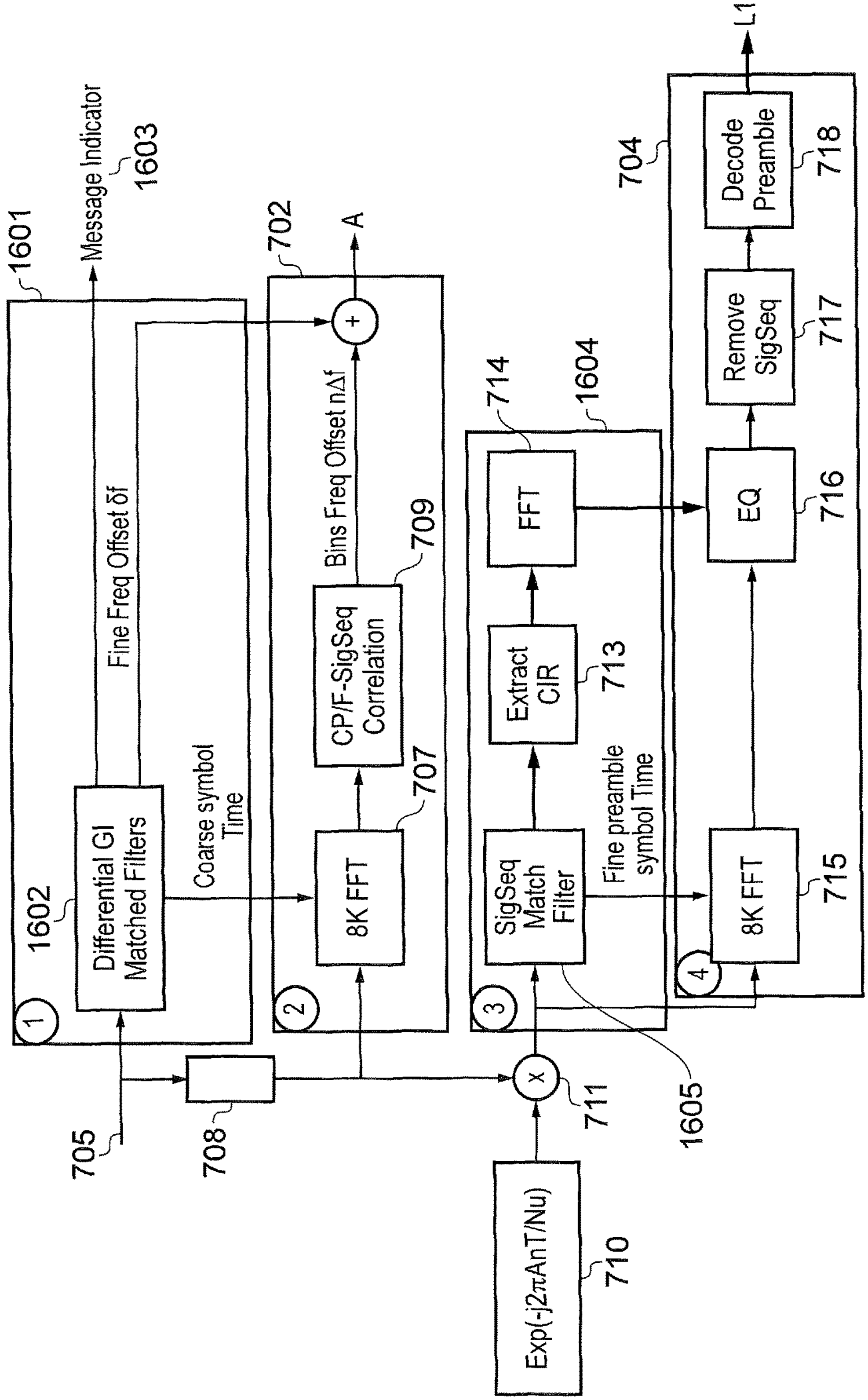
FIG. 16 provides a schematic diagram showing a receiver in accordance with an embodiment of the present technique for receiving signalling data via a signalling or preamble OFDM symbol and receiving a choice of signature sequence message in a guard period of a preamble OFDM symbol.

FIG. 16 provides a schematic diagram of a receiver in accordance with an embodiment which is configured to receive preambles described with reference to FIGS. 14 and 15. A number of the elements of the receiver of FIG. 16 are substantially similar to those previously described with reference to FIG. 7 and for brevity only those that differ shall be described. The received baseband signal is first input into processing stage 1601 and a differential guard interval matched filtering unit 1601. As will be explained below, differential encoding is used in conjunction with the matched filter in order to reduce the effects of frequency offsets in the received signal. Within the differential guard interval matched filtering unit 1602, samples of the relevant portions (i.e. the portions which were used to form the guard interval or cyclic prefix) of the differentially encoded signature sequences are utilised to populate the taps of the guard interval duration matched filters, where there is a matched filter corresponding to each signature sequence from the set of signature sequences. The differentially encoded received signal is then filtered by each of the matched filters and a peak of a sufficient amplitude or a greatest amplitude at the output of one of the filters indicates that the a portion of the signature sequence corresponding to that filter has been detected and therefore that it is the corresponding signature sequence that was combined with the signalling symbol. In FIG. 16 this indication is denoted as a message indicator 1603. In addition to outputting a message indicator, the differential matched filtering unit 1602 also estimates the coarse symbol timing and fine frequency offset required in later stages of the receiver. In processing stage 1604 of the receiver, only a single matched filter procedure is required, where the matched filter corresponds to the signature sequence detected by the differential guard interval matched filtering unit 1602. Apart from the use of only a single matched filter at processing stage 1604, the processing within processing stage 1604 corresponds to that described with reference to processing stage 703 in FIG. 7.

As described above, the matched filtering has two purposes. Firstly, it provides the fine frequency offset and coarse symbol timing estimates which are required to position the Fourier transform window and perform frequency offset correction later in the receiver, respectively. Secondly, performing the matched filtering allows the receiver to determine which signature sequence has been transmitted prior to signature sequence matched filtering that occurs in element 1602 of the receiver. As well as providing an indication of the signature sequence which has been combined with the signalling data symbol earlier than the existing transmission and reception methods, the receiver of FIG. 16 also utilises reduced length matched filters compared to those in stage 1602 because the length of the matched filter is only required to match the number of samples in the guard interval rather than the number samples in the entire preamble.

Differential Guard Interval Matched Filtering

In the embodiments of the present technique, guard interval matched filtering replaces the guard interval correlation at processing stage 1601. However, matched filtering is not immune to frequency offsets in the received signal. Consequently, if a signature sequence which forms the guard interval is to be detected, a coarse symbol timing obtained, and a fine frequency offset measured, means to overcome the frequency offset in the received signal is required. As is known in the art, differential encoding a signal removes any frequency offset present a signal. Consequently, in accordance with some embodiments and as described above, this is achieved by differential encoding of the received signal and the signature sequences of the set of signature sequences prior to the guard interval matched filtering.

Figure 17:
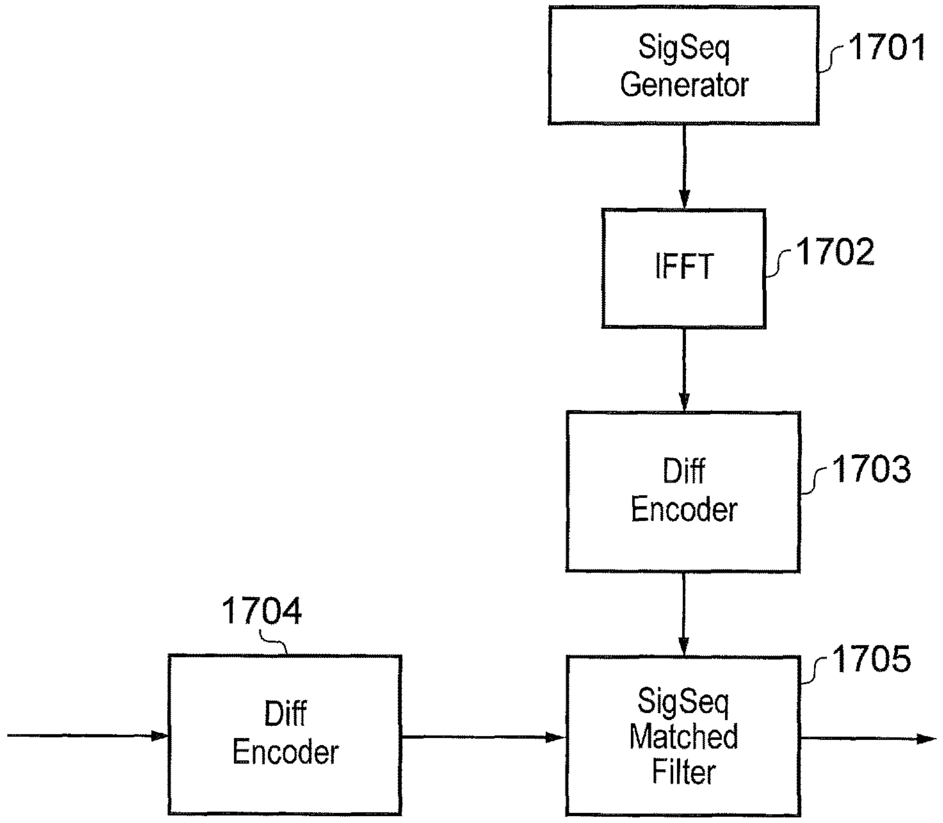
FIG. 17 provides a schematic diagram of a differential guard interval matched filter in accordance with an embodiment of the present technique.

FIG. 17 provides a schematic illustration of one of the differential guard interval matched filters that forms the differential guard interval matched filtering unit 1602. The received baseband signal is differentially encoded by the differential encoder 1704 and one of the signatures sequences from the set of signature sequences is generated by the signature sequence generator 1701 and transformed into the time domain by the inverse Fourier transform unit 1702. The time domain signature sequence is then differentially encoded by the differential encoder 1703. The differentially encoded received signal is then match filtered by a filter whose taps correspond to the samples of relevant portion of the differentially encoded time domain signature sequence. This process is performed for each of the signature sequences of the set of signature sequences and the presence of a particular signature sequence is determined by detecting a peak in the output of the appropriate matched filter. The position of the peak in the signal output from the matched filter also indicates the coarse symbol timing and the argument of the peak indicates the fine frequency offset of the received signal.

Figure 18:
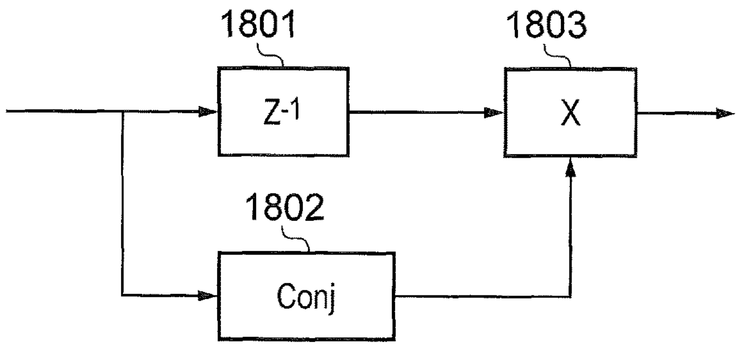
FIG. 18 provides a schematic diagram of a differential encoder.

FIG. 18 provides an illustration of a differential encoder 1704 or 1703. An input signal such as the received signal or a portion of a signature sequence is delayed by one sample by a delay element 1801 and a second version of the input signal is conjugated by the conjugator 1802. The respective signals output by 1801 and 1802 are then multiplied by a complex multiplier 1803 to produce a differential encoded version of the input signal.

Figure 19:
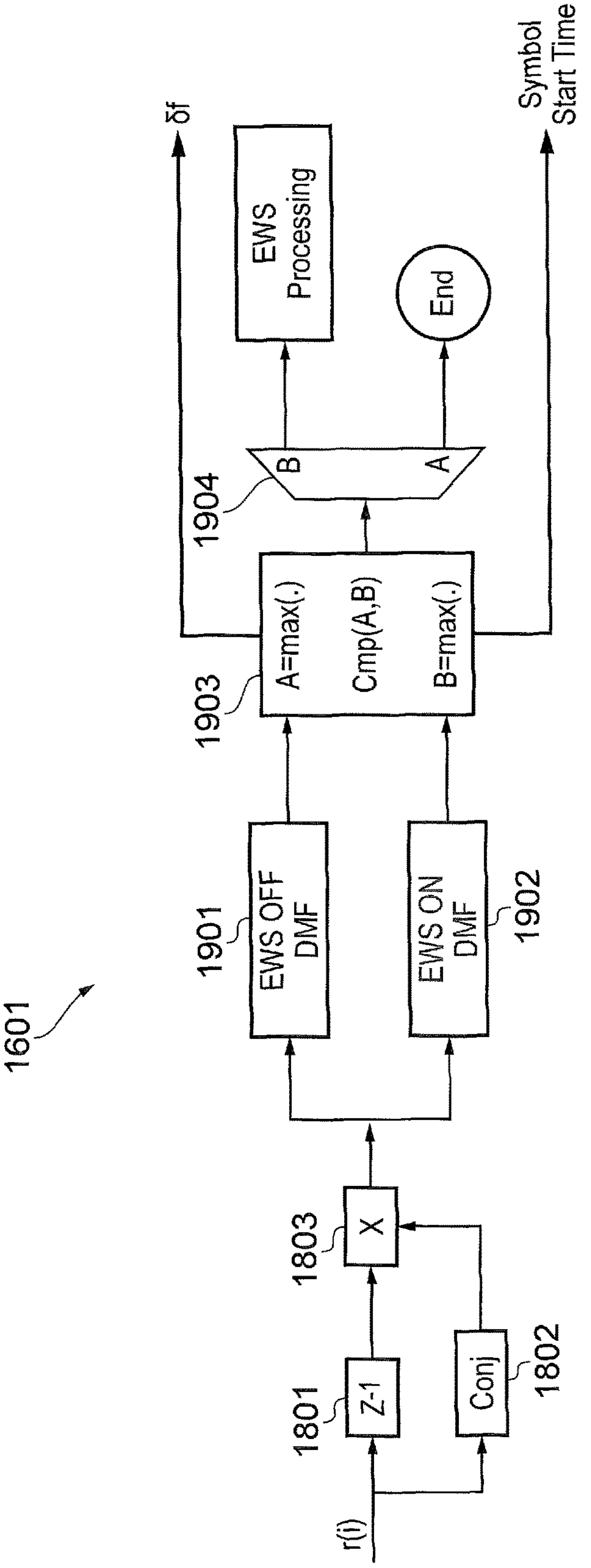
FIG. 19 provides a schematic diagram of a differential guard interval matched filter in accordance with an embodiment of the present technique.

FIG. 19 provides a schematic illustration of an example of processing stage 1601 which may form a part of an embodiment where the message conveyed by the guard interval is the presence or absence of a EWS and EWS related data in the signalling and payload data. The sampled baseband received signal is first differential encoded as previously described and it is then matched filtered by two matched filters 1901 and 1902, which are matched to a differentially encoded portion of each of the signature sequences that correspond to the guard interval of the preamble. The output from each of the matched filters is input to a comparator 1903 which indicates to a demultiplexer whether a EWS signal is present or not, but also outputs a fine frequency offset and a coarse symbol timing based on positions of peaks in the signals output from the differential matched filters 1901 and 1902. If a signature sequence indicating 'EWS on' is detected the receiver will commence EWS processing where data in the signalling or the payload data is detected and appropriately processed, for displaying on a TV screen for example. If a signature sequence indicating 'EWS off' is detected the receiver may continue with the processing of the received signal as recited above with reference to FIG. 16 if the television or reception apparatus is currently being used. Alternatively, if the device is in a standby-mode the receiver will not proceed with decoding the remainder of the received signal and—the receiver would go back to standby to wake up at the time when the next preamble is expected.

Figure 20:
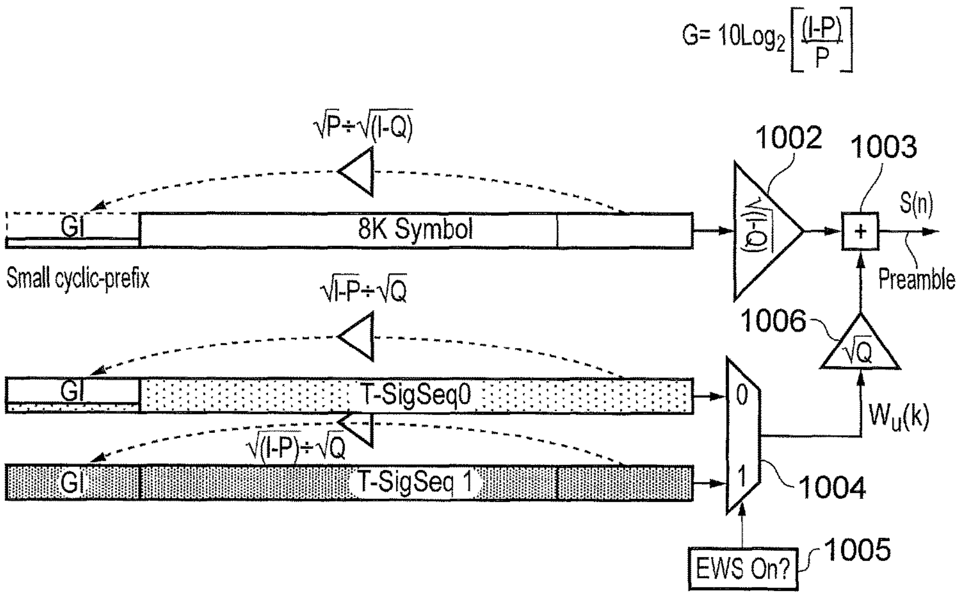
FIG. 20 provides a schematic diagram showing a transmitter in accordance with an embodiment of the present technique for transmitting signalling data via a signalling or preamble OFDM symbol and transmitting a message via a choice of signature sequence in a guard period of a preamble OFDM symbol as may be conceived in the time domain.

FIG. 20 provides a schematic diagram of a time domain functional view of the transmitter in accordance with an example embodiment. The structure of this functional view of the transmitter is substantially similar to that illustrated in FIG. 13 but the signals that are combined differently. In a previous embodiment the guard interval of the preamble was completely formed from a portion of the chosen signature sequence. However, in this embodiment the guard interval is formed from both a portion of the signature sequence and the signalling symbol, where the signalling symbol in the guard interval is at a lower amplitude compared to the portion of signature sequence. In accordance with the explanation provided above with respect to the operation of the transmitter shown in FIG. 15, the gain provided to each of the samples of the signature signal/sequence and the samples of the OFDM signalling symbol are $\sqrt{Q}$ and $\sqrt{1-Q}$ respectively during the useful part of the symbol and the gain of the guard interval samples for the signature signal and the OFDM signalling symbol are respectively $\sqrt{1-P}$ and $\sqrt{P}$.

In some existing OFDM systems, a cyclic prefix or guard interval is formed from a portion of the useful symbol and so a slight misplacement of the FFT window due to inaccurate timing information does not significantly impact upon the decoding accuracy of the data contained in the FFT window. This robustness arises because any portion of the signalling cut off from the end of the symbol is also contained in the guard interval and therefore will still be captured by the misplaced FFT window. However, in the previous embodiment functionally illustrated in FIGS. 13 and 14, misplacement of the FFT window due to multipath propagation may result in inter-carrier interference (ICI) amongst the data sub-carriers of the signalling OFDM symbol thereby degrading decoding accuracy because a portion of the signalling OFDM symbol is no longer repeated in the guard interval. Consequently, in the present embodiment, by introducing a portion of the signalling OFDM symbol into the guard interval the adverse effects of FFT window misplacement can be reduced. Although the amplitude of the signalling OFDM symbol in the guard interval is comparatively low, it has been shown that this improves a decoding accuracy of the signalling OFDM symbol. Furthermore, the low amplitude of the guard interval signalling data, allows the differential guard interval matched filtering of the received signal to be unaffected by the samples of the signalling OFDM symbol, thus maintaining the receiver's ability to detect which signature sequence has been transmitted and the associated message indicator.

Figure 21:
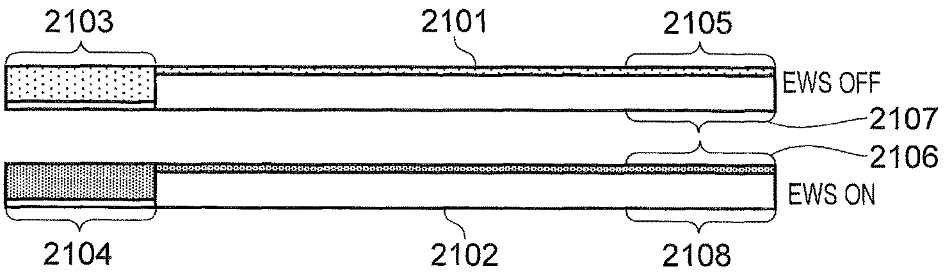
FIG. 21 provides a schematic diagram showing a preamble in accordance with an embodiment of the present technique for transmitting signalling data and a message via a signature sequence in a guard period of a preamble OFDM symbol.
Figure 22:
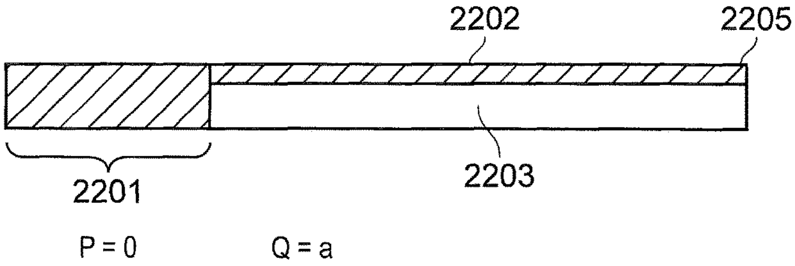
FIG. 22 provides a schematic diagram showing a preamble OFDM symbol in accordance with an embodiment of the present technique for transmitting signalling data and a signature sequence in a guard period.

FIG. 21 provides an illustration of preambles that may be formed by the transmitter of FIG. 20 when the message conveyed by the signature sequence selection is the presence or absence of a EWS. As can be seen from FIG. 21, the preambles 2101 and 2102 each include a guard period 2103 and 2104 which are formed primarily from portions of the signature sequences 2105, 2106 but also from portions of the signalling OFDM symbol 2107, 2108. In some examples, the signalling OFDM symbol portion of the guard interval may have an amplitude of −8 dB compared to the signature sequence and the signature sequence and signalling OFDM symbol may be formed from 8 k OFDM symbols which have approximately 6912 useful subcarriers. Furthermore, the guard interval may be $^{57}/_{128}$ of 8192 samples in length, therefore having a length of 3648 samples. Although these parameters are suitable for 8 k OFDM symbol, the parameters are merely example parameters and may vary depending on other characteristics of system, for example the separation between transmitters and the required capacity of the system.

In receivers disclosed in the Applicant's co-pending UK patent application 1305795.5, constant amplitude zero autocorrelation (CAZAC) sequences were proposed as a suitable sequences for the signature sequences. However, in embodiments differential encoding of CAZAC sequences can reduce a likelihood of correctly detecting the symbol timing and the signature sequence from which a guard interval is formed.

Further Example Embodiments

Further example embodiments of the present technique will now be described with reference to FIGS. 22 to 28. In accordance with the examples shown in FIG. 14, in one example, the samples of the guard interval are generated entirely from the signal samples or part of the signal samples of the signature sequence. Thus in FIG. 22, in correspondence with the parameters for generating the signature sequence shown in FIG. 15 and explained above, the value of P=0, so that the guard interval part 2201 does not include any component from the OFDM signalling symbol 2203, which is usually generated according to a cyclic prefix. The value of Q can be set to any value (Q=a) in order to vary the component of the signature sequence which is added to the OFDM symbol carrying the signalling data. Thus the OFDM signalling symbol 2205 includes a component from the samples of the signature signal 2202. According to this example there is an improved likelihood of detecting the signature sequence because the guard interval does not include any samples of the OFDM symbol.

As will be explained shortly in other examples the samples of the signature sequence present in the guard interval can be cancelled from the OFDM symbol carrying the signalling data in the presence of an echo path which may cause inter-channel interference. Such an effect of an echo path is illustrated in FIG. 23.

Figure 23:
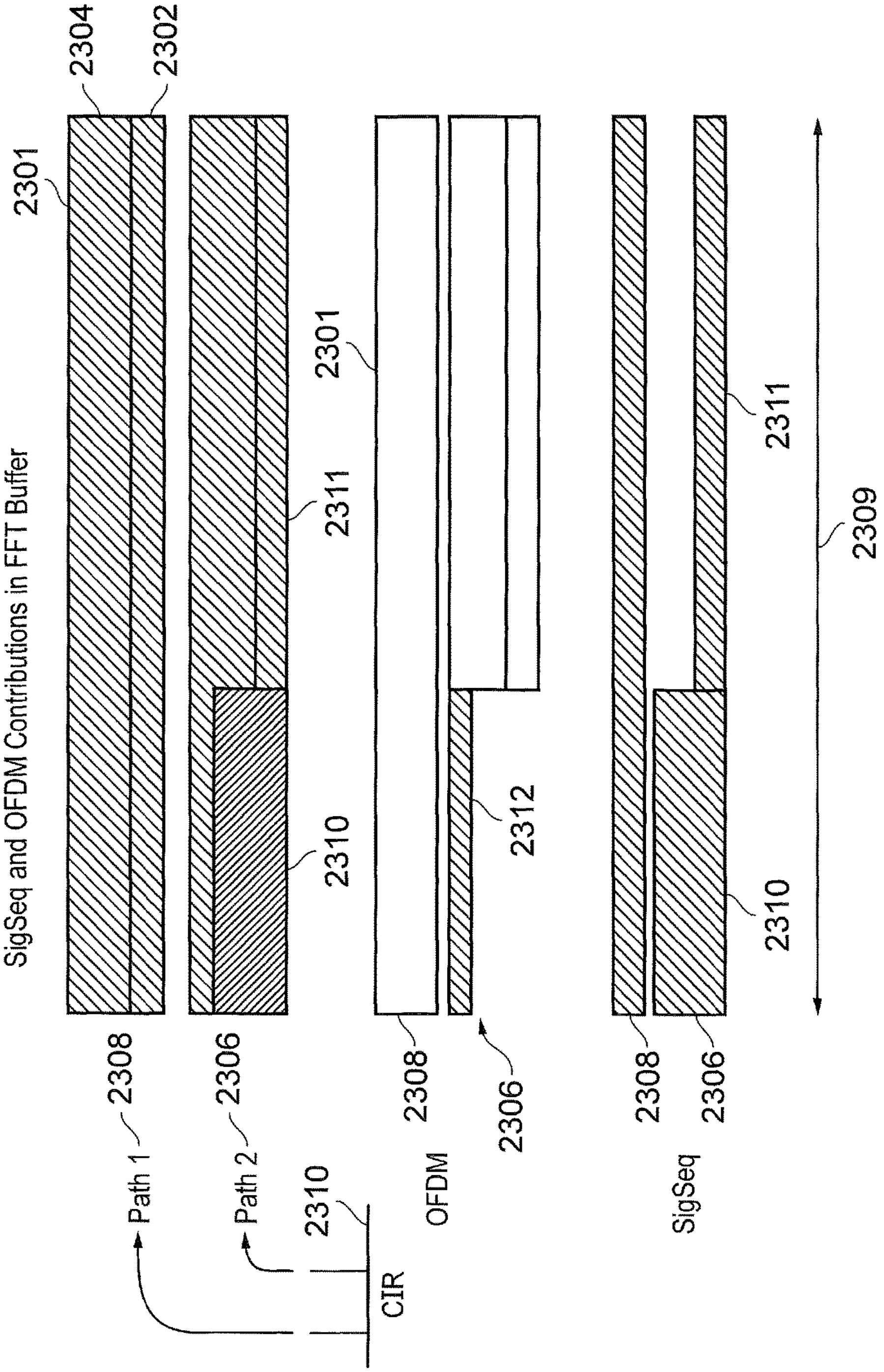
FIG. 23 is an illustrative representation of example preamble OFDM symbols which are combined at a receiver as a result of passing through a channel impulse response having a significant echo path to form a received signal at the receiver.

In FIG. 23, an OFDM symbol formed as a preamble carrying the useful data which in this case is the signalling data 2301 comprises a component formed from the signature sequence 2302 and samples formed from the useful part of the OFDM symbol 2304. The same preamble sequence is then shown as if transmitted by a second path 2306 in respect of a first path 2308. The two paths 2306, 2308 are formed by a channel impulse response 2310. The effect is to delay the transmission of the preamble with respect to the first path 2308 so that a portion 2310 of the guard interval appears within an FFT buffer period 2309 as a result of the time delay caused with respect to the second path 2306. Accordingly, the samples of the OFDM symbol with respect to the first path 2308 are shown for the FFT buffer 2309 which includes only samples of the OFDM symbol. However, as a result of the delay from the second path 2306 the FFT buffer would include samples 2312 which are provided from the guard interval. Correspondingly, for the signature sequence the samples from the first path 2308 are shown with respect to the samples of the second path 2306 which includes a component 2310 and the component 2311 from the OFDM symbol.

Figure 24:
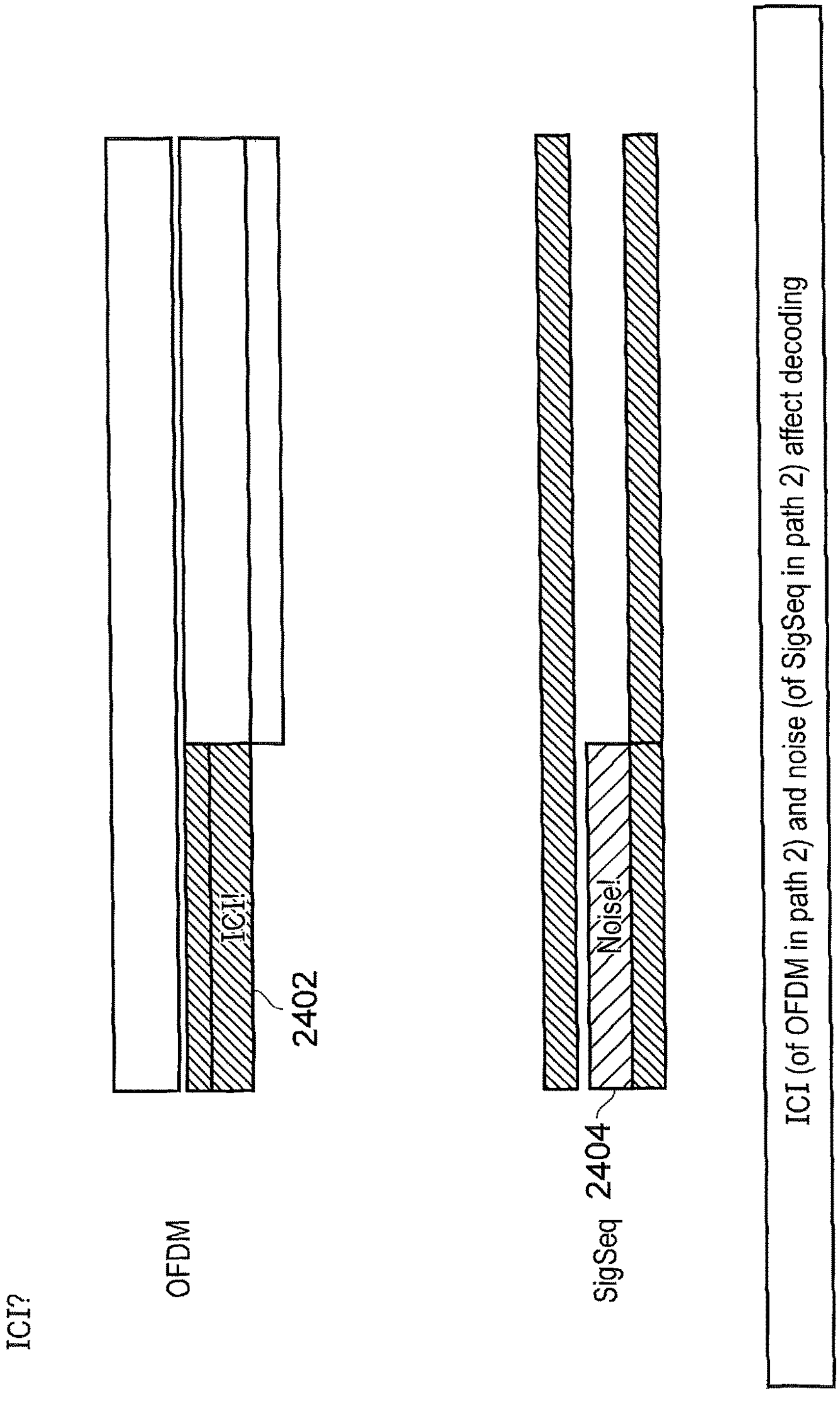
FIG. 24 is a schematic representation of the example preamble OFDM symbols formed into a received signal as represented in FIG. 23 illustrating a formation of interchannel interference and noise from the signature sequence.

Correspondingly, FIG. 24 shows the effect of the second path 2306 of the channel impulse response 2310. As shown in FIG. 24 the presence of the guard interval samples from the signature sequence 2310 causes inter-channel interference when the signals from the first and second paths 2306, 2308 are combined which represents inter-channel interference 2402 for the detection of the signalling data from the OFDM symbol. Equivalently in respect of the signature sequence, the presence of the additional samples of the second path causes noise 2404 in those parts of the received signal which are affected by the presence of the guard interval within the FFT buffer.

Figure 26:
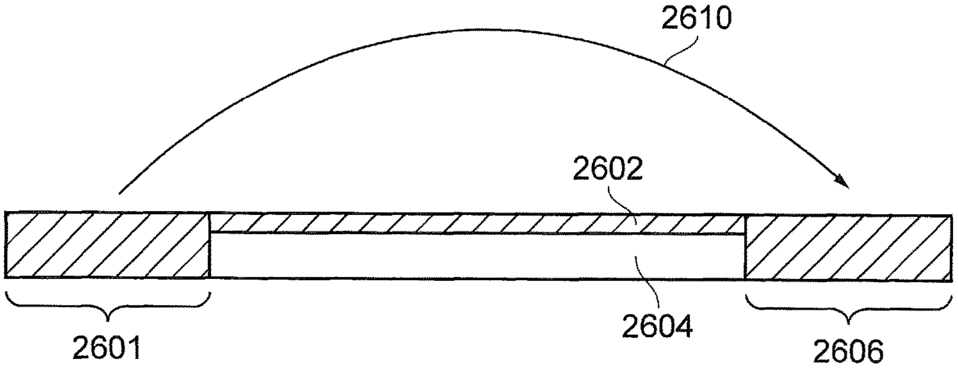
FIG. 26 provides a schematic diagram showing a preamble in accordance with an embodiment of the present technique for transmitting signalling data and a signature sequence in a guard period of a preamble OFDM symbol and including a post-fix formed from the samples of the guard interval by the transmitter of FIG. 25.
Figure 25:
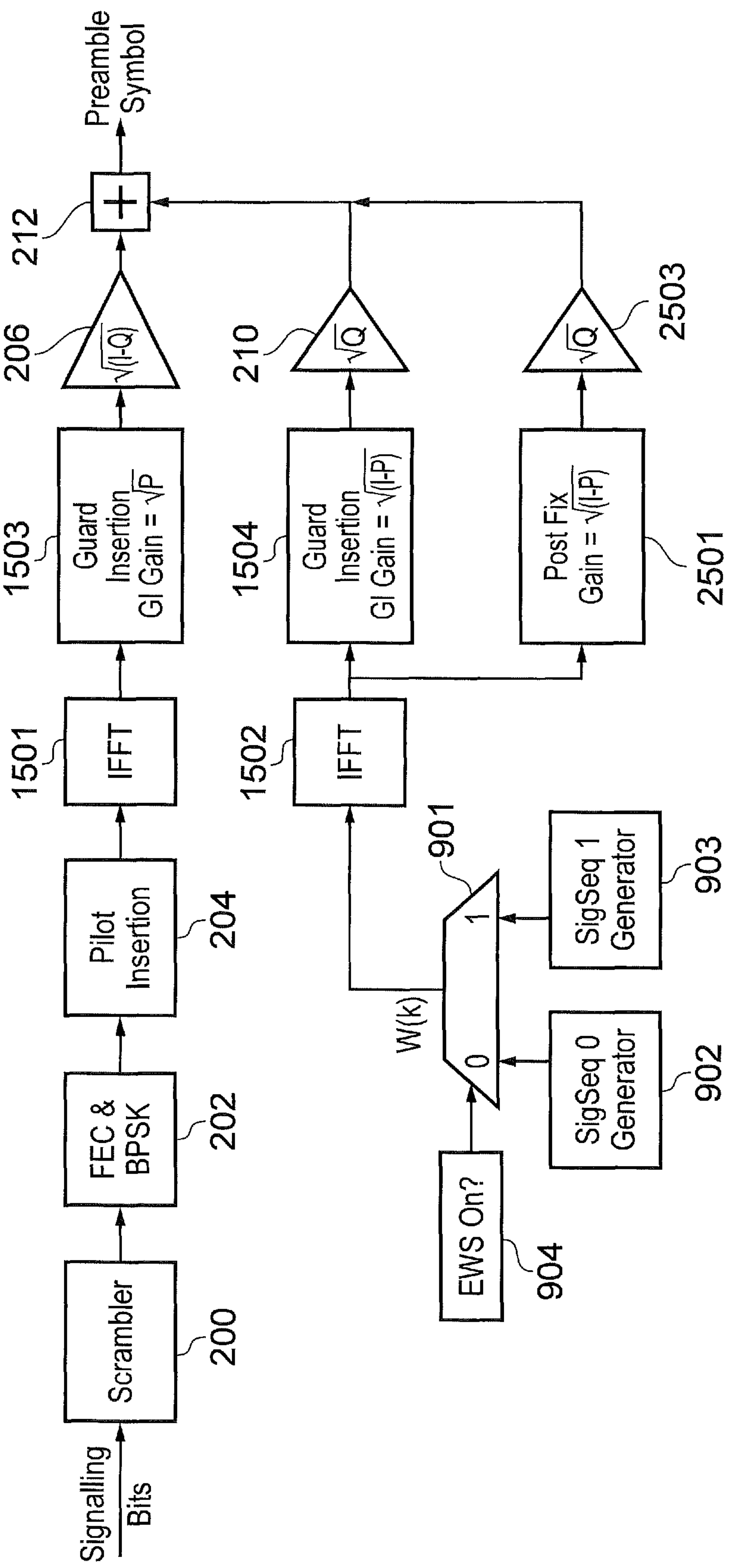
FIG. 25 provides a schematic diagram showing a transmitter in accordance with an embodiment of the present technique corresponding to the example shown in FIG. 15, and also including a post-fix insertion circuit.

According to the present technique in one example the transmitter is adapted to include a post fix circuit which adds a post fix formed from the samples of the guard interval to the preamble. An example is shown in FIG. 25 which is based on FIG. 15 but adapted to include a post fix circuit 2501. In accordance with the present technique the samples of a signature sequence which form a guard interval are used to form a post fix signal which is fed to a corresponding gain unit 2503 and added to the OFDM symbol to form a preamble symbol. The preamble symbol produced by the transmitter of FIG. 25 is illustrated in FIG. 26. The preamble signal shown in FIG. 26 corresponds to the example shown in FIG. 22 in which the factor of P=0 and therefore the guard interval 2601 is made entirely from samples of the signature sequence. With the value of Q equal to some value (a) then the component of the signature sequence combined with the OFDM symbol is shown to form a fraction of the component of the OFDM symbol 2602. The remaining part of the OFDM symbol is made from samples of the subcarriers which are conveying the signalling data 2604. However, as shown in FIG. 26, as a result of the presence of the post fix circuit 2501 and the gain adjustment circuit 2503 the preamble symbol includes a post fix component 2606 which may comprise all or some of the time domain samples of the signatures sequence which is used to form the guard interval 2601 as represented by an arrow 2610.

Figures 27A, 27B, 27C, 27D:
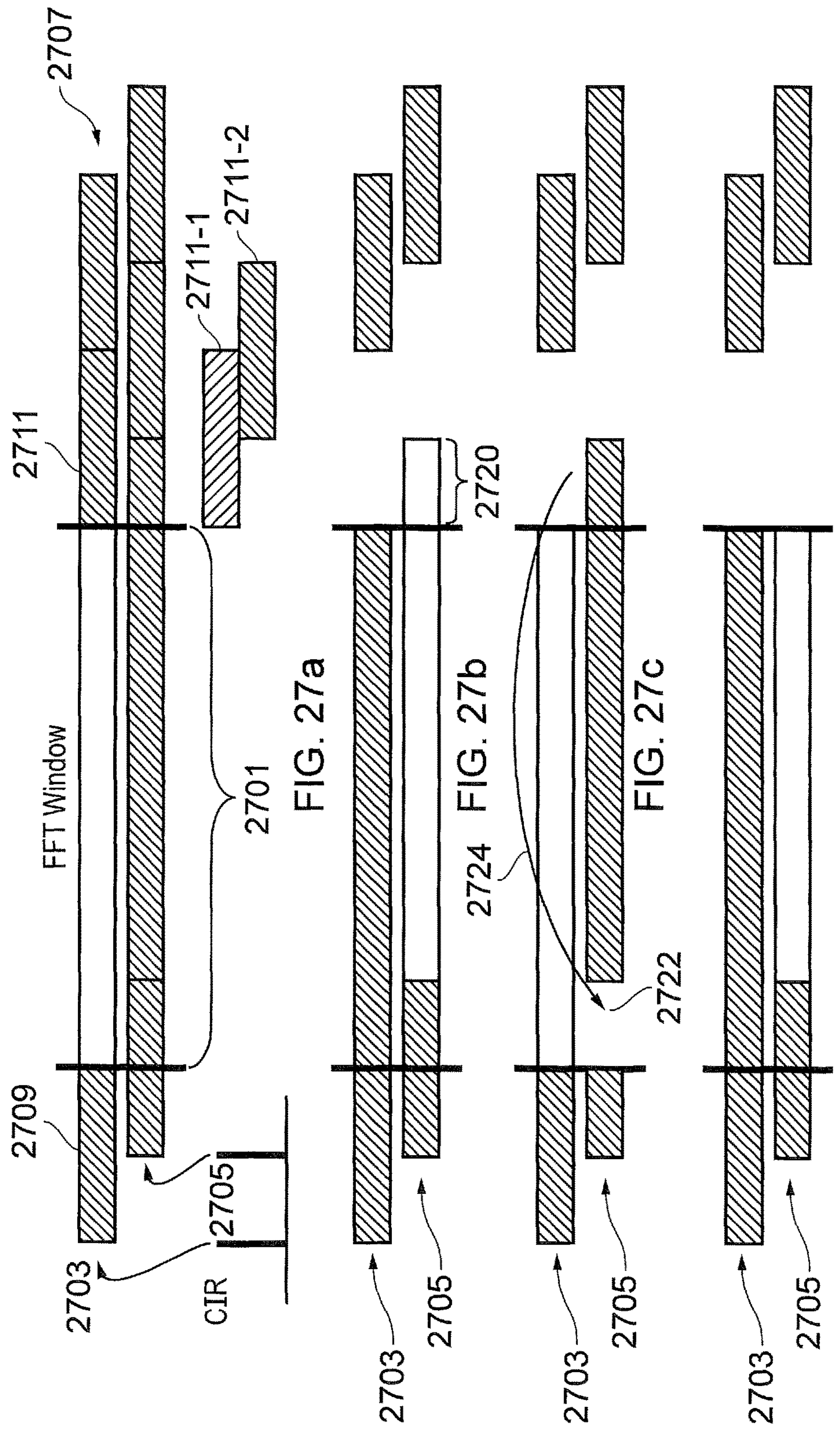
FIGS. 27*a* to 27*d* provide an illustrative representation of an example operation of a receiver which uses a post-fix of the preamble OFDM symbol to recover signalling data through the use of an FFT.

According to the present technique a receiver can then detect the signalling data and the signature sequence in the presence of a significant echo path which causes the inter-channel interference and signature sequence noise showing in FIG. 24. As shown in FIG. 27*a* the FFT window position 2701 is shown for a first path 2703 and a second path 2705. In correspondence with the present embodiment the preamble 2707 includes a guard interval 2709 which is made from the samples of the signature sequence and a post-fix 2711, which is formed from a part or all of the samples of the guard interval samples, which samples are themselves formed from the signature sequence samples.

As shown in FIG. 27*a*, after having generated an estimate of the channel impulse response 2714 which includes the two paths 2703, 2705, a receiver can regenerate the components of the post-fix 2711.1, 2711.2 using the corresponding samples of the signature sequence which were used to form the post-fix 2711. By combining the re-generated components 2711.1, 2711.2 according to the channel impulse response 2714, and subtracting the combined components from the received signal, a signal is formed as shown in FIG. 27*b*. As can be seen in FIG. 27*b*, a part of the samples of the signalling OFDM symbol are formed 2720, but outside the FFT window 2701. Furthermore as shown in FIG. 27*c*, the FFT window 2701 does not include a section 2722 of the OFDM symbols samples, which are required to recover the signalling data. Accordingly, by copying the signal samples 2720 to the position 2722 as represented by an arrow 2724, the received signal shown in FIG. 27*d* is formed from which the signalling data can be recovered.

Figure 28:
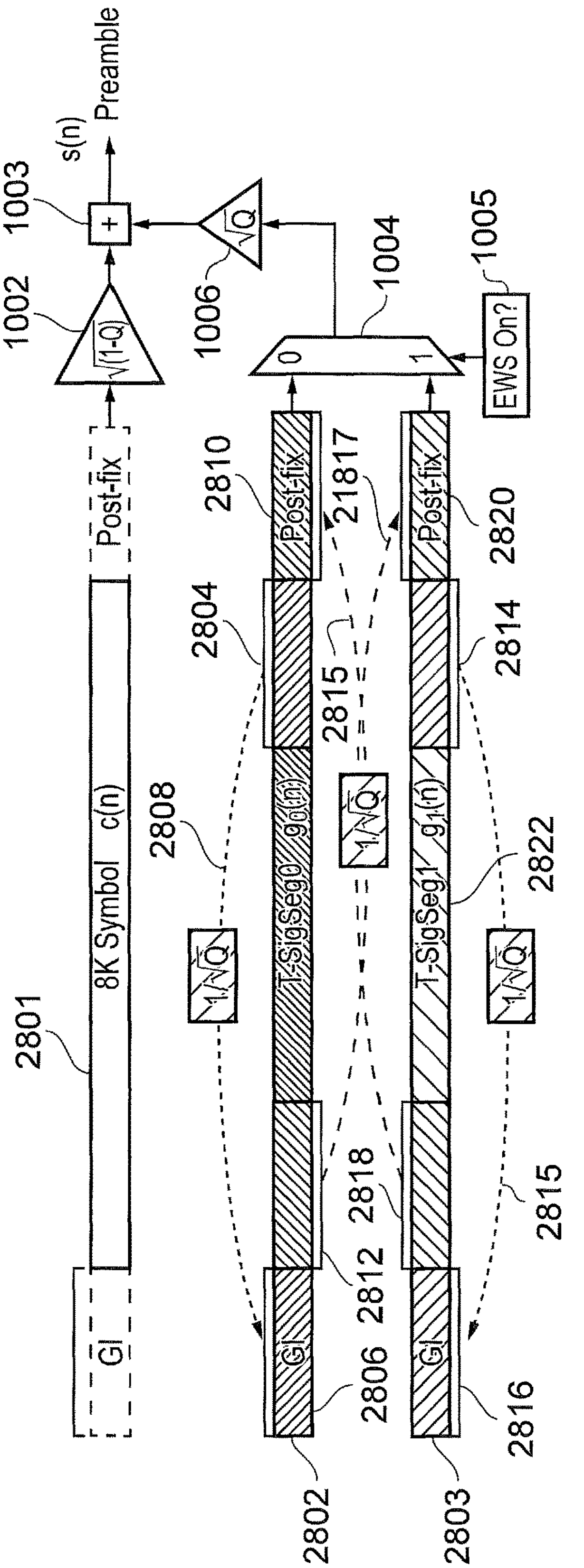
FIG. 28 provides a schematic diagram showing a preamble in accordance with an embodiment of the present technique for transmitting signalling data and a signature sequence in a guard period of a preamble OFDM symbol and including a post-fix formed from the samples of the signature sequence which are different to those from which the guard interval is formed.

A further example embodiment of the present technique is shown in FIG. 28. The illustration shown in FIG. 28 corresponds substantially to the examples shown in FIGS. 10, 13 and 20 so corresponding features have the same numerical designations. In correspondence with the example shown in FIG. 20 the preamble is formed from the first 8K OFDM symbol 2801, which is arranged to carry the signalling data and to which a signature sequence T-SigSeg0 2802 or T-SigSeg1 2803 is to be combined. However, the example embodiment shown in FIG. 28 is adapted to address a further improvement with respect to the example preamble shown in FIG. 26. The preamble shown in FIG. 28 also has a post-fix as well as a guard interval forming a pre-fix. However, it has been identified that if the post-fix signal samples and the pre-fix signal samples are the same, then at the receiver may mistake the post-fix as the guard interval and attempt to recover the signalling data from the wrong samples of the OFDM symbol. The receiver may detect the EWS indication using a matched filter having and impulse response corresponding to the samples of the guard interval, which is therefore looking for the pre-fix. In fact two match filters are used to filter the samples of the preamble, a first which has an impulse response matched to the signal samples of the signature sequence used to form the guard interval or pre-fix with EWS on (T-SigSeq1) and another matched filter with an impulse response matched to the signal samples of the signature sequence used to form the guard interval or pre-fix with EWS off (T-SigSeq0). As soon as one of the matched filters detects the guard interval/pre-fix then decoding begins of the preamble which follows in order to acquire additional EWS information, which is provided by the signalling data carried by the remainder of the OFDM symbol. This is in order to minimise a time to detect EWS. However, if the guard interval/pre-fix is the same as the post-fix and the receiver turns on between the pre-fix and the post-fix because it has detected the post-fix by mistake, because the post-fix has the same samples of the signature sequence as the guard interval/pre-fix then because it detected the post-fix instead it has no way of knowing that the following 8K samples are not the preamble symbols until it decodes and determines that detection of the signalling data fails, for example a CRC or error correction decoding fails, or the integrity of the data does not correspond to the pre-determined expected format. Accordingly, this would lengthen the time to detect the EWS indication.

According to the present technique a transmitter shown in FIG. 28 is adapted to form the guard interval/pre-fix with different samples of the signature sequence then the post-fix. Therefore, according to the present technique one part of the signature sequence is used to form the guard interval/pre-fix and a different part of the signature sequence is used to form the post-fix and the remaining or a further part of the signature sequence is combined with the OFDM symbol forming the preamble. As shown in FIG. 28 in one part of the signature sequence to 2804 is used to form the guard interval 2806 with a gain of 1√Q as represented by an arrow 2808. As for the example shown in FIG. 26 no components of the signal samples of the body of the OFDM symbol are included in the guard interval. The post-fix 2810 is formed from the samples of the signature sequence 2812 from an earlier part of the signature sequence samples which are added to the OFDM symbol. By arranging for the samples of the guard interval in the samples of the post-fix of the signature sequence to be taken from opposite ends of the signature sequence samples which are combined with the body of the OFDM symbol, there is a reduced likely hood of the post-fix being confused with the guard interval/pre-fix at the receiver and accordingly the aforementioned problem of miss detecting the EWS information provided in the signature sequence is less likely.

A corresponding example is shown for the samples of the signature sequence for indicating that the EWS is on 2803 (T-SigSeq1) with samples of the signature sequence 2814 being copied to form the guard interval 2816 as represented by an arrow 2815 with a gain of 1√Q and samples of an earlier part of the signature sequence 2818 being formed into the post-fix 2820 as represented by an arrow 2817 with a gain of 1√Q with remaining samples of the signature sequence 2822 being combined with the OFDM payload carrying samples as explained with reference to FIGS. 21 and 26. As for the example shown in FIG. 26, the factor of P=0 and therefore the guard interval 2601 is made entirely from samples of the signature sequence. With the value of Q equal to some value (a) then the component of the signature sequence combined with the OFDM symbol forms a fraction of the component of the OFDM symbol.

The following numbered clauses define further example aspects and features of the present technique:

1. A transmitter for transmitting payload data using Orthogonal Frequency Division Multiplexed (OFDM) symbols, the transmitter comprising a frame builder configured to receive the payload data to be transmitted and to receive signalling data for use in detecting and recovering the payload data at a receiver, and to form the payload data with the signalling data into frames for transmission, a modulator configured to modulate a first OFDM symbol with the signalling data and to modulate one or more second OFDM symbols with the payload data, a signature sequence circuit for providing a signature sequence, a combiner circuit for combining the signature sequence with the first OFDM symbol, a prefixing circuit for prefixing a guard interval to the first OFDM symbol to form a preamble, and a transmission circuit for transmitting the preamble and the one or more second OFDM symbols, wherein the guard interval is formed from time domain samples of part of the signature sequence.

2. A transmitter according to clause 1, wherein the guard interval includes only the time domain samples of the part of the signature sequence.

3. A transmitter according to clause 1 or 2, wherein the amplitude of the samples of the part of the signature sequence which are combined with the first OFDM symbol are less than the amplitude of the samples of the first OFDM symbol which are produced by modulating the sub-carriers with the signalling data.

4. A transmitter according to clause 1, 2 or 3, wherein the prefixing circuit is configured to form the guard interval from one part of the time domain samples of the signature sequence and the transmitter comprises a post fixing circuit which is configured to add another part of the time domain samples of the signature sequence as a post fix to the first OFDM symbol, the preamble comprising the guard interval with the time domain samples of the one part of the signature sequence as a pre-fix to the first OFDM symbol and the post-fix comprising the time domain samples of the other part of the signature sequence, the time domain samples of the one part of the signature sequence being different from the time domain samples of the other part of the signature sequence.

5. A transmitter according to clause 4, wherein the combiner circuit is configured to combine the time domain samples of the signature sequence or a part of the signature sequence with the first OFDM symbol, and the prefixing circuit is configured to form the guard interval with the time domain samples of the one part of the signature sequence from samples which are copied from the time domain samples of the signature sequence which are combined by the combiner circuit with the first OFDM symbol, and the post fixing circuit is configured to add the other part of the time domain samples of the signature sequence as a post fix to the first OFDM symbol, from samples which are copied from the time domain samples of the signature sequence which are combined by the combiner circuit with the first OFDM symbol.

6. A transmitter according to any of clauses 1 to 5, wherein the signature sequence processor circuit is a pseudo random binary sequence generator, an M-sequence generator or a Gold code sequence generator.

7. A transmitter according to any of clauses 1 to 6, wherein the message provided by the selection of the signature sequence is an indication of a presence of an early warning signal.

8. A transmitter according to any of clauses 1 to 7, wherein the signature sequence processor circuit includes a pseudo random binary sequence generator comprising a linear feedback shift register for in-phase samples (I) or quadrature phase samples (Q), and a generator polynomial for the linear feedback shift register for the in-phase and quadrature samples are selected from the following:

$$x^{13}+x^{11}+x+1$$

$$x^{13}+x^{9}+x^{5}+1$$

-continued $$x^{13}+x^{10}+x^{5}+1$$

$$x^{13}+x^{11}+x^{10}+1$$

9. A transmitter according to any of clauses 1 to 8, wherein an initialisation for the linear feedback shift register for in-phase (I) or quadrature phase samples (Q) is one of the following:

Initialisation (*LSB* first)

1111111111111

1110111011111

0110110110111

0101010101010

10. A receiver for detecting and recovering payload data from a received signal, the receiver comprising a detector circuit for detecting the received signal, the received signal comprising the payload data, signalling data for use in detecting and recovering the payload data, the signalling data being carried by a first Orthogonal Frequency Division Multiplexed (OFDM) symbol, and the payload data being carried by one or more second OFDM symbols, and the first OFDM symbol having been combined with a signature sequence and prefixed with a guard interval comprising one part of the signature sequence to form a preamble, a synchronisation circuit comprising a matched filter having an impulse response which has been matched to the signature sequence with the effect that an output of the matched filter generates a signal representing a correlation of the signature sequence with the received signal, and a demodulator circuit for recovering the signalling data from the first OFDM symbol for recovering the payload data from the second OFDM symbols, wherein the guard interval is formed from the other part of the time domain samples of the signature sequence, the receiver including a matched filtering circuit comprising a guard interval duration matched filter, the guard interval duration matched filter having an impulse response formed from a predetermined portion of time domain samples of the signature sequence, with the effect that the guard interval duration matched filter generates a signal based on a correlation of the predetermined portion of time domain samples of the signature sequence with a portion of the received signal corresponding to the guard interval, such that the matched filtering circuit can detect the signature sequence from which the guard interval of the received signal has been formed and with which the first OFDM symbol has been combined.

11. A receiver according to clause 10, wherein the guard interval includes only the time domain samples of the part of the signature sequence.

12. A receiver according to clause 10 or 11, wherein the amplitude of the samples of the signature sequence which are combined with the first OFDM symbol are less than the amplitude of the samples of the first OFDM symbol which are produced by modulating the sub-carriers with the signalling data.

13. A receiver according to clause 10, 11 or 12, wherein the matched filtering circuit comprising one or more matched filters having an impulse response which is matched to a differentially encoded predetermined portion of the time domain samples of a different one of the set of signature sequences, with the effect that an output of each of the guard interval duration matched filters generates a signal representing a correlation of the differentially encoded predetermined portion of the time domain samples of one of the set of signature sequences with a differentially encoded portion of the received signal corresponding to the guard interval.

14. A receiver according to any of clauses 10 to 13, wherein the signature sequence processor circuit is a pseudo random binary sequence generator, an M-sequence generator or a Gold code sequence generator.

15. A receiver according to any of clauses 10 to 14, wherein the message provided by the selection of the signature sequence is an indication of an early warning signal.

16. A receiver according to any of clauses 10 to 15, wherein the signature sequence is generated using a linear feedback shift register for in-phase samples (I) or quadrature phase samples (Q), and a generator polynomial for the linear feedback shift register for the in-phase and quadrature samples are selected from the following:

$$x^{13}+x^{11}+x+1$$

$$x^{13}+x^{9}+x^{5}+1$$

$$x^{13}+x^{10}+x^{5}+1$$

$$x^{13}+x^{11}+x^{10}+1$$

17. A receiver according to any of clauses 10 to 16, wherein an initialisation for the linear feedback shift register for in-phase (I) or quadrature phase samples (Q) is one of the following:

Initialisation (*LSB* first)

1111111111111

1110111011111

0110110110111

0101010101010

Various further aspects and features of the present technique are defined in the appended claims and various combinations of the features of the dependent claims may be made with those of the independent claims other than the specific combinations recited for the claim dependency. Modifications may also be made to the embodiments hereinbefore described without departing from the scope of the present technique. For instance, processing elements of embodiments may be implemented in hardware, software, and logical or analogue circuitry. Furthermore, although a feature may appear to be described in connection with particular embodiments, one skilled in the art would recognise that various features of the described embodiments may be combined in accordance with the present technique.

The invention claimed is:

1. A transmitter for transmitting payload data using Orthogonal Frequency Division Multiplexed (OFDM) symbols, the transmitter comprising:

a frame builder configured to receive the payload data to be transmitted, receive signaling data for use in detecting and recovering the payload data at a receiver, and arrange the payload data and the signaling data into frames;

a signature sequence circuit configured to receive messaging data as an input, select a signature sequence representing a content of the messaging data, the content of the messaging data indicating whether to cause the receiver to switch from a low-power or standby state to a normal state to decode the payload data or the signaling data, and select the signature sequence to convey information indicating a presence or an absence of an active early warning Signal (EWS) within the payload data or the signaling data, wherein the signature sequence is selected from a set of signature sequences, the selected signature sequence being scaled;

a modulator configured to generate OFDM symbols based on the frames, and modulate one of the OFDM symbols with the signature sequence;

a prefixing circuit configured to prefix a guard interval to the modulated OFDM symbol, the guard interval including a portion of time domain samples of the signature sequence; and a transmission circuit configured to transmit the modulated OFDM symbol along with the prefixed guard interval.

2. The transmitter as claimed in claim 1, wherein the transmitter comprises a post fixing circuit configured to add a post fix to the modulated OFDM symbol, the post fix including all or some of time domain samples of the signature sequence used to form the guard interval.

3. The transmitter as claimed in claim 1, wherein the signature sequence circuit is a pseudo random binary sequence generator, an M-sequence generator, or a Gold code sequence generator.

4. The transmitter as claimed in claim 1, wherein the signature sequence circuit comprises a constant amplitude zero autocorrelation (CAZAC) sequence generator.

5. A receiver for detecting a signal transmitted by the transmitter of claim 1, the receiver comprising circuitry configured to switch from the low-power or standby state to the normal state and decode the payload data or the signaling data in response to the indication of the messaging data which is represented by the signature sequence that is modulated on the modulated OFDM symbol.

6. The transmitter as claimed in claim 1, wherein the modulator is configured to modulate the one of the OFDM symbols with the signature sequence by adjusting a time domain representation of the one of the OFDM symbols based on the signature sequence.

7. The transmitter as claimed in claim 1, wherein the transmitter comprises a post fixing circuit configured to add a post fix to the modulated OFDM symbol, the post fix being formed of a portion of time domain samples of the guard interval.

8. A receiver to detect and recover payload data from a received signal, the receiver comprising:

a detector circuit configured to detect the received signal, the received signal comprising the payload data, signaling data for use in detecting and recovering the payload data, and messaging data, the received signal representing Orthogonal Frequency Division Multiplexed (OFDM) symbols, a modulated OFDM symbol, and a guard interval prefixed to the modulated OFDM symbol, a content of the messaging data being represented by a signature sequence having being modulated onto an OFDM symbol to form the modulated OFDM symbol, the modulated OFDM symbol being prefixed with the guard interval comprising part of time domain samples of the signature sequence, and the content of the messaging data indicating whether to cause the receiver to switch from a low-power or standby state to a normal state to decode the payload data or the signaling data, and conveying information indicating a presence or an absence of an active early warning signal (EWS) within the payload data or the signaling data, wherein the signature sequence is selected from a set of signature sequences, the selected signature sequence being scaled;

a synchronization circuit comprising a matched filter having an impulse response which has been matched to the signature sequence with effect that an output of the matched filter generates a signal representing a correlation of the signature sequence with the received signal;

a demodulator circuit configured to recover from the modulated OFDM symbol and the OFDM symbols the signaling data and the payload data when the receiver is in the normal state; and a matched filtering circuit including a guard interval duration matched filter, the guard interval duration matched filter having an impulse response formed from a predetermined portion of time domain samples of a known signature sequence, with effect that the guard interval duration matched filter generates a signal indicating the content based on a correlation of the predetermined portion of time domain samples of the known signature sequence with a portion of the received signal corresponding to the guard interval, wherein the receiver is configured to operate in the low-power or standby state or the normal state consistent with the content indicated by the generated signal.

9. The receiver as claimed in claim 8, wherein the receiver further comprises guard interval and post fix removal circuitry configured to remove the guard interval and a post fix, the post fix including a portion of time domain samples of the guard interval.

10. The receiver as claimed in claim 8, wherein the receiver further comprises a signature sequence circuit including a pseudo random binary sequence generator, an M-sequence generator, or a Gold code sequence generator.

11. The receiver as claimed in claim 8, wherein the receiver further comprises a signature sequence circuit including a constant amplitude zero autocorrelation (CAZAC) sequence generator.

12. A method of transmitting payload data using Orthogonal Frequency Division Multiplexing (OFDM), the method comprising:

receiving the payload data to be transmitted;

receiving messaging data;

receiving signaling data for use in detecting and recovering the payload data at a receiver;

arranging the payload data and the signaling data into frames;

selecting, by circuitry, a signature sequence representing a content of the messaging data, the content of the messaging data indicating whether to cause the receiver to switch from a low-power or standby state to a normal state to decode the payload data or the signaling data, and selecting the signature sequence to convey information indicating a presence or an absence of an active early warning signal (EWS) within the payload data or the signaling data, wherein the signature sequence is selected from a set of signature sequences, the selected signature sequence being scaled;

generating OFDM symbols based on the frames; modulating one of the OFDM symbols with the signature sequence;

prefixing a guard interval to the modulated OFDM symbol, the guard interval including a portion of time domain samples of the signature sequence; and transmitting the modulated OFDM symbol along with the prefixed guard interval.

13. The method according to claim 12, further comprising adding a post fix to the modulated OFDM symbol, the post fix including a portion of time domain samples of the guard interval.

14. A method of receiving a signal transmitted according to the method of claim 12, the method of receiving comprising switching from the low-power or standby state to the normal state and decoding the payload data or the signaling data in response to the indication of the messaging data which is represented by the signature sequence that is modulated on the modulated OFDM symbol.

15. A method of detecting and recovering payload data from a received signal, the method comprising:

detecting the received signal by a receiver, the received signal comprising the payload data, signaling data for use in detecting and recovering the payload data, and messaging data, the signaling data being carried by Orthogonal Frequency Division Multiplexed (OFDM) symbols, a modulated OFDM symbol, and a guard interval prefixed to the modulated OFDM symbol, a content of the messaging data being represented by a signature sequence having been modulated onto an OFDM symbol to form the modulated OFDM symbol, the modulated OFDM symbol being prefixed with the guard interval comprising part of time domain samples of the signature sequence, the content of the messaging data indicating whether to cause the receiver to switch from a low-power or standby state to a normal state to decode the payload data or the signaling data, and conveying information indicating a presence or an absence of an active early warning signal (EWS) within the payload data or the signaling data, wherein the signature sequence has been selected from a set of signature sequences, the selected signature sequence having been scaled;

filtering the received signal with a matched filter having an impulse response that has been matched to the signature sequence with effect that an output of the matched filter generates a signal representing a correlation of the signature sequence with the received signal;

recovering from the modulated OFDM symbol and the OFDM symbols the signaling data and the payload data when the receiver is in the normal state;

filtering the guard interval of the received signal with a guard interval duration matched filter, the guard interval duration matched filter having an impulse response formed from a predetermined portion of time domain samples of a known signature sequence, with effect that the guard interval duration matched filter generates a signal indicating the content based on a correlation of the predetermined portion of time domain samples of the known signature sequence with a portion of the received signal corresponding to the guard interval; and operating the receiver in the low-power or standby state or in the normal state consistent with the content indicated by the generated signal.

16. A receiver, comprising:

a signal reception circuitry, configured to:

receive a signal, the received signal including Orthogonal Frequency Division Multiplexed (OFDM) symbols for conveying payload data and signaling data for use in detecting and recovering the payload data, an OFDM symbol having been modulated with a signature sequence that represents a content of messaging data, the content of the messaging data conveying information indicating a presence or an absence of an active early warning signal (EWS) within the payload data or the signaling data, wherein the signature sequence has been selected from a set of signature sequences, the selected signature sequence having been scaled;

extract the content of the messaging data, including using a guard to guard interval in the signal to detect, by synchronization circuitry, the signature sequence, the guard interval including a portion of time domain samples of the signature sequence; and switch the receiver from a low-power or standby state to a normal state and decode the payload data or the signaling data in response to an indication of the content of the messaging data.

17. The receiver as claimed in claim 16, wherein the selected signature sequence that has been scaled comprises scaled binarized coefficients modulated per sub-carrier with the OFDM symbol to form the modulated OFDM symbol.

18. The receiver as claimed in claim 16, wherein the circuitry is configured to extract the content of the messaging data further based on interpreting a post-fix to the modulated symbol that comprises time domain samples of the signature sequence.

19. The receiver as claimed in claim 16, wherein the circuitry is configured to extract the content of the messaging data by configuring the circuitry to test for known signature sequences in accordance with an output of a linear feedback shift register of the receiver.

20. The receiver as claimed in claim 16, wherein the synchronization circuitry identifies frames of the signal using the signature sequence.

21. The receiver as claimed in claim 16, wherein the synchronization circuitry identifies frames of the signal using a modulated OFDM symbol having (i) as a prefix, first samples of the signature sequence, and (ii) as a post-fix, second samples of the signature sequence.

22. A television receiver comprising the receiver as claimed in claim 17, wherein the television receiver comprises an integrated display.

23. A receiving method for a receiver including a signal reception circuitry, the method comprising:

receiving a signal by the signal reception circuitry, the received signal including Orthogonal Frequency Division Multiplexed (OFDM) symbols for conveying payload data and signaling data for use in detecting and recovering the payload data, an OFDM symbol having been modulated with a signature sequence that represents a content of messaging data, the content of the messaging data conveying information indicating a presence or an absence of an active early warning signal (EWS) within the payload data or the signaling data, wherein the signature sequence is selected from a set of signature sequences, the selected signature sequence having been scaled;

extracting the content of the messaging data, including using a guard interval in the signal to detect, by synchronization circuitry, the signature sequence, the guard interval including a portion of time domain samples of the signature sequence; and switching the receiver from a low-power or standby state to a normal state and decoding the payload data or the signaling data in response to an indication of the content of the messaging data.

24. The receiving method as claimed in claim 23, wherein the selected signature sequence that has been scaled comprises scaled binarized coefficients modulated per sub-carrier with the OFDM symbol to form the modulated OFDM symbol.

25. The receiving method as claimed in claim 24, further comprising identifying, by the synchronization circuitry, frames of the signal using a modulated OFDM symbol having (i) as a prefix, first samples of the signature sequence, and (ii) as a post-fix, second samples of the signature sequence.

* * * * *

UNITED STATES PATENT AND TRADEMARK OFFICE

CERTIFICATE OF CORRECTION

| | |
|---|---|
| PATENT NO. | : 10,404,507 B2 |
| APPLICATION NO. | : 14/897468 |
| DATED | : September 3, 2019 |
| INVENTOR(S) | : Samuel Asangbeng Atungsiri |

It is certified that error appears in the above-identified patent and that said Letters Patent is hereby corrected as shown below:

On the Title Page

Item (54) and in the Specification, Column 1, the Title of Invention should read:
-- IMPLICIT SIGNALLING IN OFDM PREAMBLE WITH EMBEDDED SIGNATURE SEQUENCE, AND CYCLIC PREFIX AND POSTFIX AIDED SIGNATURE DETECTION --

Signed and Sealed this
Seventeenth Day of December, 2019

Andrei Iancu
*Director of the United States Patent and Trademark Office*